US008878817B2

(12) United States Patent
Noma et al.

(10) Patent No.: US 8,878,817 B2
(45) Date of Patent: Nov. 4, 2014

(54) AREA SENSOR AND LIQUID CRYSTAL DISPLAY DEVICE WITH AREA SENSOR

(75) Inventors: Mikihiro Noma, Osaka (JP); Shinichi Miyazaki, Osaka (JP); Kengo Takahama, Osaka (JP); Yoshiharu Yoshimoto, Osaka (JP); Keisuke Iwasaki, Osaka (JP)

(73) Assignee: Sharp Kabushiki Kaisha, Osaka-shi, Osaka (JP)

( * ) Notice: Subject to any disclaimer, the term of this patent is extended or adjusted under 35 U.S.C. 154(b) by 605 days.

(21) Appl. No.: 13/145,231

(22) PCT Filed: Aug. 28, 2009

(86) PCT No.: PCT/JP2009/065111
§ 371 (c)(1),
(2), (4) Date: Jul. 19, 2011

(87) PCT Pub. No.: WO2010/084640
PCT Pub. Date: Jul. 29, 2010

(65) Prior Publication Data
US 2011/0279414 A1 Nov. 17, 2011

(30) Foreign Application Priority Data
Jan. 20, 2009 (JP) ................................ 2009-010229

(51) Int. Cl.
| G06F 3/042 | (2006.01) |
| G09G 3/36 | (2006.01) |
| G06F 3/041 | (2006.01) |
| G02F 1/1335 | (2006.01) |
| G02F 1/133 | (2006.01) |

(52) U.S. Cl.
CPC ...... *G06F 3/042* (2013.01); *G02F 2001/13312* (2013.01); *G06F 3/0412* (2013.01); *G02F 2203/11* (2013.01); *G02F 1/1336* (2013.01)
USPC ............. 345/175; 345/87; 345/102; 345/173

(58) Field of Classification Search
CPC ...... C06F 3/0421; C06F 3/0412; C06F 3/042; C06F 3/0317; C06F 3/0488; C06F 3/04883; C06F 3/044; C06F 3/045; G09G 3/3648; G09G 3/3688; G09G 3/3611; G09G 3/3655; G09G 3/3406; G09G 2320/0646; G09G 2360/16; G09G 2320/064

USPC .................................. 345/175, 87, 102, 173
See application file for complete search history.

(56) References Cited

U.S. PATENT DOCUMENTS

| 2006/0007224 A1 | 1/2006 | Hayashi et al. |
| 2006/0244693 A1 | 11/2006 | Yamaguchi et al. |
| 2007/0296688 A1 | 12/2007 | Nakamura et al. |
| 2009/0033638 A1 | 2/2009 | Yamaguchi et al. |
| 2009/0161051 A1* | 6/2009 | Fukunaga et al. ............ 349/115 |
| 2009/0245696 A1* | 10/2009 | Yuan et al. ..................... 382/312 |

FOREIGN PATENT DOCUMENTS

| JP | 8-286206 A | 11/1996 |
| JP | 2005-275644 A | 10/2005 |
| JP | 2006-18219 | 1/2006 |
| JP | 2006-301864 | 11/2006 |

OTHER PUBLICATIONS

International Search Report for PCT/JP2009/065111, mailed Dec. 1, 2009.

* cited by examiner

*Primary Examiner* — Aneeta Yodichkas
(74) *Attorney, Agent, or Firm* — Nixon & Vanderhye, P.C.

(57) ABSTRACT

A liquid crystal display device of the present invention includes a liquid crystal panel (20) having an area sensor function of detecting the position of an input from an outside source by detecting an image on a panel surface. The liquid crystal panel (20) (position detecting section), provided with visible light sensors (31A) each containing light sensor elements (30) that detect the intensity of received visible light and infrared light sensors (31B) each containing light sensor elements (30) that detect the intensity of received infrared light, which detects an input position by the visible light sensors (31A) and the infrared light sensors (31B) separately detecting an image on the detector surface. The liquid crystal display device further includes a backlight (light-emitting section) for irradiating the liquid crystal panel (20) with light containing infrared light. This achieves an area sensor capable of accurate position detection in a wide range of environmental illuminances and a liquid crystal display device equipped with such an area sensor.

19 Claims, 16 Drawing Sheets

F I G. 4
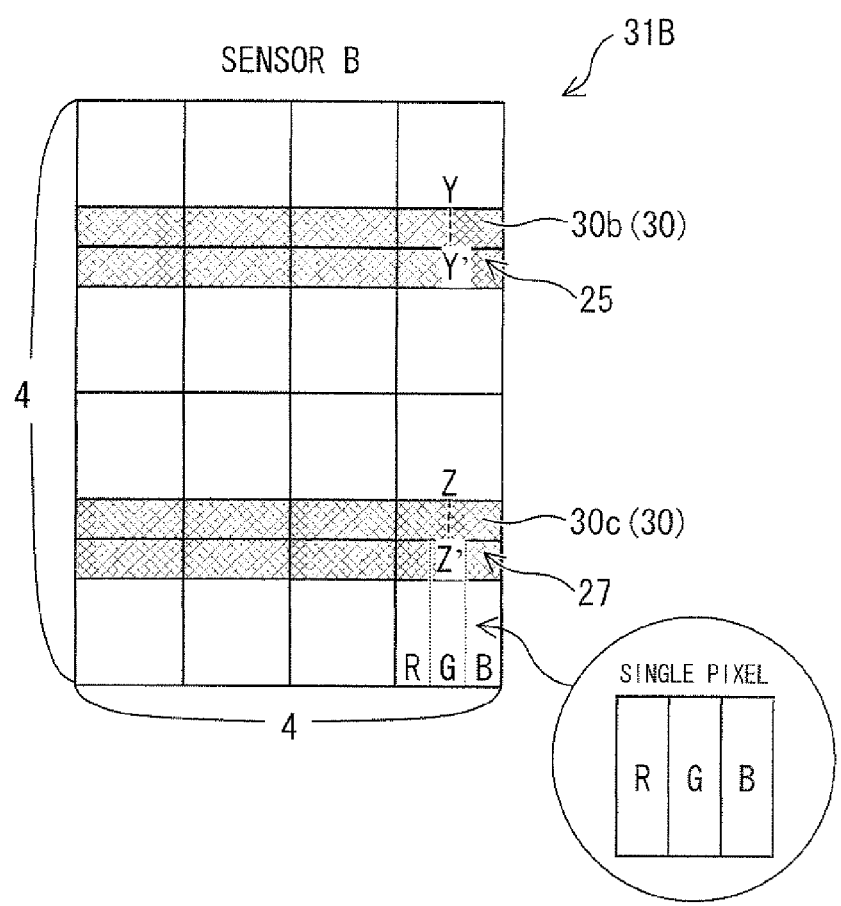

F I G. 7
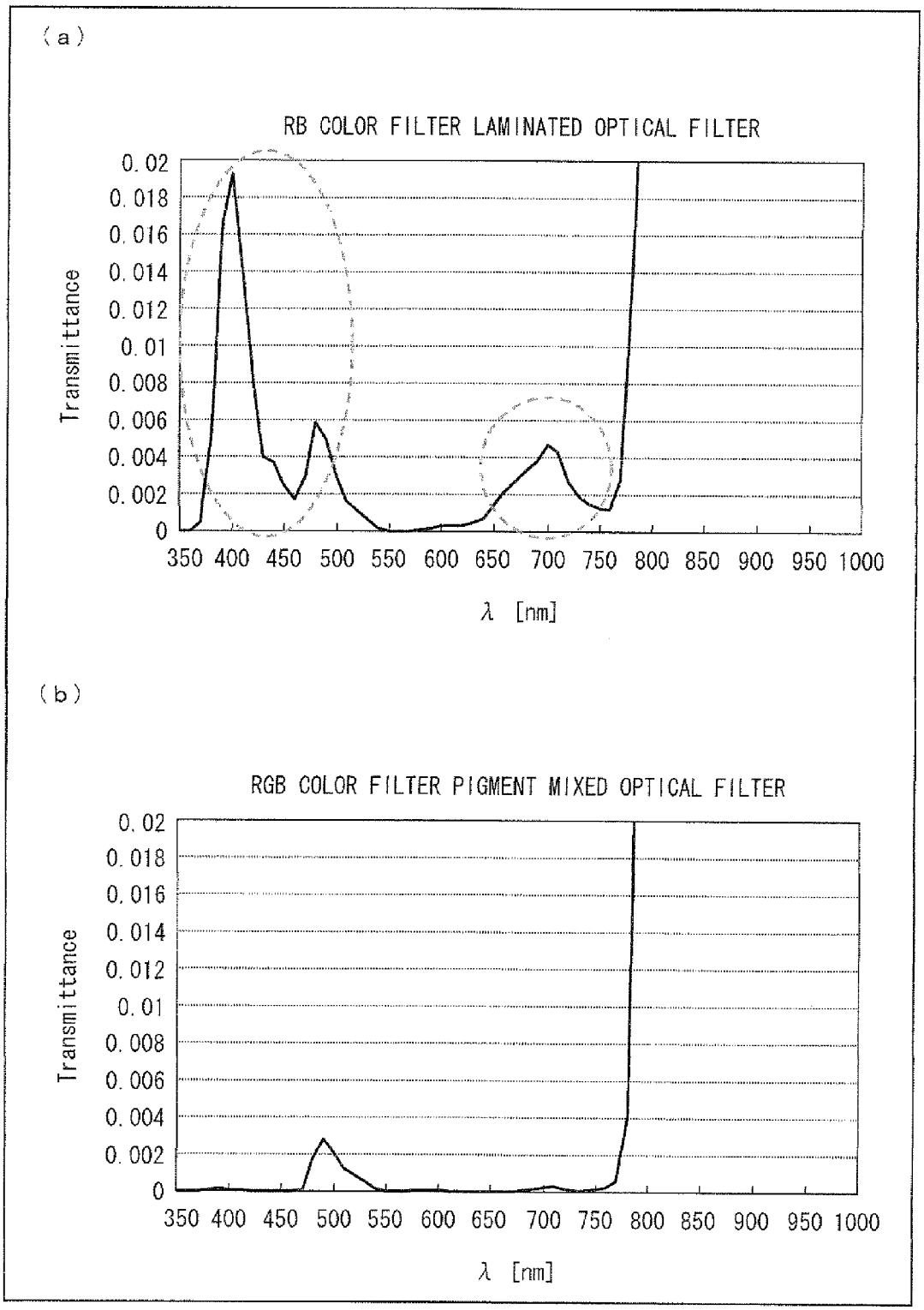

FIG.11
(a)
| ILLUMINANCE (lx) | 0 | 10 | 100 | 1000 | 10000 | 100000 |
SENSOR A 
(b)
| ILLUMINANCE (lx) | 0 | 10 | 100 | 1000 | 10000 | 100000 |
SENSOR B
(FLUORESCENT LAMP) 
SENSOR B
(SUNLAMP) 
(c)
| ILLUMINANCE (lx) | 0 | 10 | 100 | 1000 | 10000 | 100000 |
SENSOR A 
SENSOR B 

F I G. 1 5
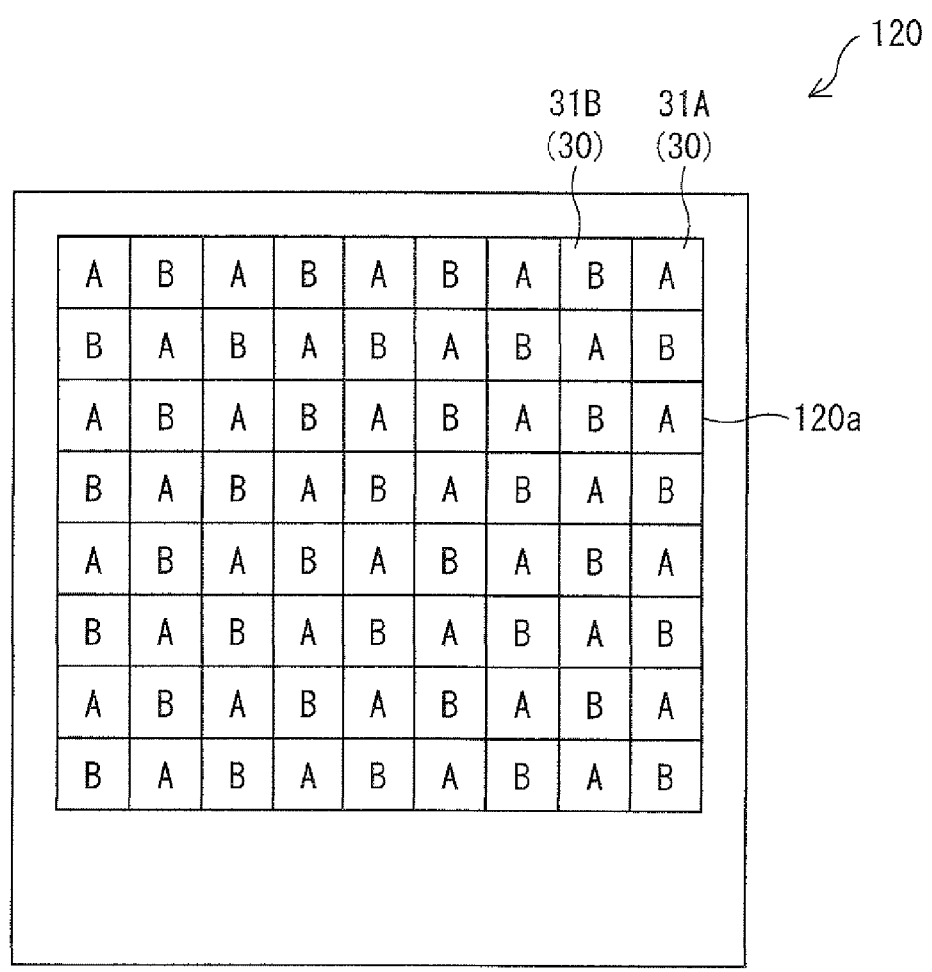

AREA SENSOR AND LIQUID CRYSTAL DISPLAY DEVICE WITH AREA SENSOR

This application is the U.S. national phase of International Application No. PCT/JP2009/065111, filed 28 Aug. 2009, which designated the U.S. and claims priority to Japan Application No. 2009-010229, filed 20 Jan. 2009, the entire contents of each of which are hereby incorporated by reference.

TECHNICAL FIELD

The present invention relates to: an area sensor, including light sensor elements, which detects the position of an input from an outside source; and a liquid crystal display device having such an area sensor built-in.

BACKGROUND ART

Among display devices, such as liquid crystal display devices, which are under development, there have been touch-panel-integrated display devices each having a touch panel (area sensor) function that makes it possible to detect the position of contact of an input pen with the panel surface.

Mainstream examples of conventional touch-panel-integrated display devices include a resistive type (which, when pressed, detects the position of an input through contact between upper and lower conductive substrates) and a capacitance type (which detects the position of an input by detecting a change in capacitance of a place touched).

Meanwhile, in recent years, the development of a liquid crystal display device having a light sensor element such as a photodiode or a phototransistor provided in each pixel (or in each unit of a plurality of pixels) within an image display region has been advanced (e.g., see Patent Literature 1). By thus having a light sensor element built in each pixel, an ordinary liquid crystal display device can fulfill a function as an area sensor (specifically, a scanner function, a touch panel function, etc.). That is, by such light sensor elements fulfilling a function as an area sensor, a display device integrated with a touch panel (or with a scanner) can be achieved.

CITATION LIST

Patent Literature 1

Japanese Patent Application Publication, Tokukai, No. 2006-18219 (Publication Date: Jan. 19, 2006)

SUMMARY OF INVENTION

Technical Problem

When a liquid crystal display device including light sensor elements is used as a display device having a touch panel function, a pen or finger reflected on the display panel is captured as an image by the light sensor elements, and position detection is carried out by detecting the position of the tip of the pen or finger.

A display device that fulfils a touch panel function by light sensor elements recognizing a finger or the like reflected on the display panel suffers from such a problem that an image on the display panel becomes hard to recognize due to the influence of ambient brightness. That is, there can occur such a problem that the image on the display panel cannot be read either when the environmental illuminance is bright or dark.

In order to solve such a problem, Patent Literature 1 discloses a display device having two or more types of light sensor elements of different light sensitivities disposed on the display panel. Moreover, this display device uses high-sensitivity light sensor elements for optical information input in the case of weak outside light and uses low-sensitivity light sensor elements for optical information input in the case of strong outside light, thereby achieving optical information input in both the case of strong outside light and the case of weak outside light.

However, the different types of light sensor elements provided in the display device described in Patent Literature 1 are different in light sensitivity from each other according to the size of an amount of light, but are identical in wavelength specificity of light they can detect. For this reason, for example, when the device is used in a state where a sensor output produced by reflected light of an object of sensing and a sensor output produced by environmental light are equal to each other, both of the types of light sensor elements of different sensitivities from each other become unable to read an image. Thus, with mere use of plural types of light sensor elements of different light sensitivities from each other, the range of environmental illuminances in which the display device can be used remains limited.

The present invention has been made in view of the foregoing problems, and it is an object of the present invention to achieve an area sensor capable of accurate position detection in a wider range of environmental illuminances and a liquid crystal display device equipped with such an area sensor.

Solution to Problem

In order to solve the foregoing problems, an area sensor according to the present invention is an area sensor for detecting the position of an input from an outside source by detecting an image on a detector surface, the area sensor including: a position detecting section, provided with visible light sensors each containing light sensor elements that detect the intensity of received visible light and infrared light sensors each containing light sensor elements that detect the intensity of received infrared light, which detects an input position by the visible light sensors and the infrared light sensors separately detecting an image on the detector surface; and a light-emitting section for irradiating the position detecting section with light containing infrared light from behind.

The area sensor of the present invention has a light-emitting section for irradiating the position detecting section with light containing infrared light from behind. The phrase "irradiating the position detecting section with light from behind" here means irradiating with light a side of the position detecting section that faces away from the detector surface.

By the light-emitting section thus irradiating the position detecting section with light containing infrared light, the infrared light sensors provided in the position detecting section are allowed to detect, in accordance with the intensity of an amount of infrared light, a position on the detector surface being touched by an input pen, a finger, or the like, if such an input pen, a finger, or the like is touching the detector surface at all.

Further, the area sensor of the present invention is configured to include two types of sensors that detect light in different ranges of wavelengths from each other, namely the visible light sensors each containing light sensor elements that receive visible light and the infrared, light sensors each containing light sensor elements that receive infrared light.

The foregoing configuration makes it possible to detect an image on the detector surface separately by the visible light sensors and the infrared light sensors which detect light in different ranges of wavelengths from each other. The visible light sensors can carry out more reliable position detection in one range of environmental illuminances than the infrared light sensors, and the infrared light sensors can out more reliable position detection in another range of environmental illuminances than the visible light sensors. Therefore, the area sensor of the present invention can carry out accurate position detection in a wider range of environmental illuminances than does a conventional area sensor simply using two types of sensors of different light sensitivities.

The area sensor of the present invention is preferable configured such that the light sensor elements contained in each of the infrared light sensors are each provided with an optical filter for blocking visible light.

The foregoing configuration allows the light sensor elements contained in each of the infrared light sensors to receive light from which visible light has been cut by the optical filter, thus allowing the infrared light sensors to accurately detect the intensity of received infrared light.

The area sensor is preferably configured such that the optical filter is made of a mixture of a red pigment, a green pigment, and a blue pigment.

The foregoing configuration allows the optical filter to more surely block visible light and also allows it to be thinner than an optical filter structured by laminating color filters.

The area sensor is preferably configured such that the optical filter has a laminated structure of a red color filter and a blue color filter.

The foregoing configuration allows the optical filter to surely block visible light.

The area sensor of the present invention is preferably configured such that: if the intensity of infrared rays in an environment where the area sensor is placed is greater than or equal to a predetermined value, the position detecting section carries out position detection by using the visible light sensors; and if the intensity of infrared rays in an environment where the area sensor is placed is less than the predetermined value, the position detecting section carries out position detection by using the infrared light sensors.

Usually, in the case of a comparatively bright ambient environment (i.e., a comparatively high ambient environmental illuminance), the visible light sensors can carry out satisfactory position detection. However, when the device is used in a state where a sensor output produced by reflected light of an object of sensing and a sensor output produced by environmental light are equal to each other, e.g., when the ambient environment becomes darker, it becomes impossible to use the reflection feature or shadow feature of the object of sensing for detection. Therefore, when only the visible light sensors are used, the touched part can no longer be detected.

However, the visible light sensors and the infrared light sensors are different in sensor output characteristic from each other even in the same ambient environment. Moreover, when the intensity of infrared light contained in outside light is comparatively low, the infrared light sensors can carry out satisfactory position detection. This makes it possible to carry out accurate position detection in a wider range of environmental illuminances by, as stated above, carrying out position detection with the visible light sensors if the intensity of infrared light in the environment is greater than or equal to the predetermined value and carrying out position detection with the infrared light sensors if the intensity of infrared light in the environment is less than the predetermined value.

The area sensor of the present invention is preferably configured to further include: a light intensity sensor for measuring the intensity of infrared rays in an environment where the area sensor is placed; and a sensor switching section which, if the intensity of infrared rays measured by the light intensity sensor is greater than or equal to a predetermined value, uses information obtained from the visible light sensors as position information and which, if the intensity of infrared rays measured by the light intensity sensor is less than the predetermined value, uses information obtained from the infrared light sensors as position information.

The term "light intensity" here means the integrated radiant intensity of light that is emitted per unit area or a beam of light that is received per unit area (the latter being also referred to as "illuminance"). Therefore, the light intensity sensor is a sensor that detects either the integrated radiant intensity of light that is emitted per unit area or illuminance. Moreover, the term "infrared light intensity" means the integrated radiant intensity of light (e.g., at $\lambda$=800 to 1,000 nm) that is emitted per unit area.

The foregoing configuration makes it possible to carry out accurate position detection in a wider range of environmental illuminances by carrying out position detection with the visible light sensors if the intensity of infrared light in the environment is greater than or equal to the predetermined value and carrying out position detection with the infrared light sensors if the intensity of infrared light in the environment is less than the predetermined value.

Further, the foregoing configuration allows the sensor switching section to choose, according to ambient illuminances, between extracting information from the visible light sensors as position information and extracting information from the infrared light sensors as position information. This makes it possible to use one coordinate extraction circuit to detect position information from the two types of sensors, namely the visible light sensors and the infrared light sensors, thus achieving a reduction in circuit scale. Further, the foregoing configuration makes it unnecessary to read out information from the visible light sensors and the infrared light sensors separately as position information, thus achieving a decrease in amount of information to be processed. This makes it possible to keep both the cost of the device and power consumption low.

The area sensor is preferably configured such that the predetermined value of intensity of infrared light falls within a range of 1.00 to 1.80 mW/cm$^2$, based on the integrated radiant intensity of light at wavelengths of 800 to 1,000 nm.

The foregoing configuration makes it possible to carry out satisfactory position detection regardless of the value of intensity of infrared light by carrying out position detection with the visible light sensors if the intensity of infrared light in the environment takes on a comparatively high value greater than or equal to those in the above range and by carrying out position detection with the infrared light sensors if the intensity of infrared light in the environment takes on a comparatively low value less than those in the above range. This makes it possible to carry out satisfactory position detection regardless of the type of light with which the device is irradiated, such as sunlight or fluorescent light.

The area sensor of the present invention is preferably configured such that: if the illuminance of an environment where the area sensor is placed is greater than or equal to a predetermined value, the position detecting section carries out position detection by using the visible light sensors; and if the illuminance of an environment where the area sensor is placed is less than the predetermined value, the position detecting section carried out position detection by using the infrared light sensors.

Usually, in the case of a comparatively bright ambient environment (i.e., a comparatively high ambient environmental illuminance), the visible light sensors can carry out satisfactory position detection. However, when the device is used in a state where a sensor output produced by reflected light of an object of sensing and a sensor output produced by environmental light are equal to each other, e.g., when the ambient environment becomes darker, it becomes impossible to use the reflection feature or shadow feature of the object of sensing for detection. Therefore, when only the visible light sensors are used, the touched part can no longer be detected.

However, the visible light sensors and the infrared light sensors are different in sensor output characteristic from each other even in the same ambient environment. This makes it possible to carry out accurate position detection in a wider range of environmental illuminances by, as stated above, carrying out position detection with the visible light sensors if the environmental illuminance is comparatively bright taking on a value greater than or equal to the predetermined value and carrying out position detection with the infrared light sensors if the environmental illuminance is comparatively dark taking on a value less than the predetermined value.

The area sensor of the present invention is preferably configured to further include: an illuminance sensor for measuring the illuminance of an environment where the area sensor is placed; and a sensor switching section which, if the illuminance measured by the illuminance sensor is greater than or equal to a predetermined value, uses information obtained from the visible light sensors as position information and which, if the illuminance measured by the illuminance sensor is less than the predetermined value, uses information obtained from the infrared light sensors as position information.

The foregoing configuration makes it possible to carry out accurate position detection in a wider range of environmental illuminances by carrying out position detection with the visible light sensors if the illuminance of the environment is comparatively bright taking on a value greater than or equal to the predetermined value and carrying out position detection with the infrared light sensors if the illuminance of the environment is comparatively dark taking on a value less than the predetermined value.

Further, the foregoing configuration allows the sensor switching section to choose, according to ambient illuminances, between extracting information from the visible light sensors as position information and extracting information from the infrared light sensors as position information. This makes it possible to use one coordinate extraction circuit to detect position information from the two types of sensors, namely the visible light sensors and the infrared light sensors, thus achieving a reduction in circuit scale. Further, the foregoing configuration makes it unnecessary to read out information from the visible light sensors and the infrared light sensors separately as position information, thus achieving a decrease in amount of information to be processed. This makes it possible to keep both the cost of the device and power consumption low.

The area sensor of the present invention is preferably configured such that: the visible light sensors and the infrared light sensors are disposed in rows and columns in a matrix pattern; and the visible light sensors and the infrared light sensors are disposed alternately in a checkered pattern.

According to the foregoing configuration, a decrease in resolution due to the provision of the two types of light sensors can be minimized in comparison with the resolution of an area sensor constituted by only light sensors of one type, with the total number of light sensors unchanged.

A liquid crystal display device of the present invention has a liquid crystal panel including any one of the area sensors described above.

By including any one of the area sensors described above, the foregoing configuration can achieve an area-sensor-equipped light crystal display device capable of accurate position detection in a wider range of environmental illuminances.

In order to solve the foregoing problems, a liquid crystal display device of the present invention is a liquid crystal display device (i) including a liquid crystal panel having an active matrix substrate, a counter substrate, and a liquid crystal layer disposed therebetween and (ii) having an area sensor function of detecting the position of an input from an outside source by the liquid crystal panel detecting an image on a panel surface, the liquid crystal display device including: a position detecting section, provided with visible light sensors each containing light sensor elements that detect the intensity of received visible light and infrared light sensors each containing light sensor elements that detect the intensity of received infrared light, which detects an input position by the visible light sensors and the infrared light sensors separately detecting an image on the detector surface; and a backlight for irradiating the liquid crystal panel with light containing infrared light.

Since the liquid crystal display device of the present invention includes the backlight for irradiating the position detecting section with light containing infrared light, the infrared light sensors provided in the position detecting section are allowed to detect, in accordance with the intensity of an amount of infrared light, a position on the detector surface being touched by an input pen, a finger, or the like, if such an input pen, a finger, or the like is touching the detector surface at all.

Further, the position detecting section of the liquid crystal display device of the present invention is configured to include two types of sensors that detect light in different ranges of wavelengths from each other, namely the visible light sensors each containing light sensor elements that receive visible light and the infrared light sensors each containing light sensor elements that receive infrared light.

The foregoing configuration makes it possible to detect an image on the panel surface separately by the visible light sensors and the infrared light sensors which detect light in different ranges of wavelengths from each other. The visible light sensors can carry out more reliable position detection in one range of environmental illuminances than the infrared light sensors, and the infrared light sensors can out more reliable position detection in another range of environmental illuminances than the visible light sensors. Therefore, the area sensor of the present invention can carry out accurate position detection in a wider range of environmental illuminances than does a conventional area sensor simply using two types of sensors of different light sensitivities.

The liquid crystal display device of the present invention is preferable configured such that the light sensor elements contained in each of the infrared light sensors are each provided with an optical filter for blocking visible light.

The foregoing configuration allows the light sensor elements contained in each of the infrared light sensors to receive light from which visible light has been cut by the optical filter, thus allowing the infrared light sensors to accurately detect the intensity of received infrared light.

The liquid crystal display device is preferably configured such that the optical filter is made of a mixture of a red pigment, a green pigment, and a blue pigment.

The foregoing configuration allows the optical filter to more surely block visible light and also allows it to be thinner than an optical filter structured by laminating color filters.

The liquid crystal display device is preferably configured such that the optical filter has a laminated structure of a red color filter and a blue color filter.

The foregoing configuration allows the optical filter to surely block visible light.

Further, a color liquid crystal display device usually has a color filter layer provided in a counter substrate disposed facing an active matrix substrate. Accordingly, by forming such a laminated structure of color filters in that region on the color filter layer provided in the counter substrate which corresponds to light sensor elements that detect the intensity of infrared light, such a laminated structure can be formed at the same time as in the step of forming such color filters. This makes it possible to easily and inexpensively form two types of sensors of different spectral sensitivities within a liquid crystal panel without a change in manufacturing process.

The liquid crystal display device of the present invention is preferably configured such that: if the intensity of infrared rays in an environment where the liquid crystal display device is placed is greater than or equal to a predetermined value, the position detecting section carries out position detection by using the visible light sensors; and if the intensity of infrared rays in an environment where the liquid crystal display device is placed is less than the predetermined value, the position detecting section carries out position detection by using the infrared light sensors.

Usually, in the case of a comparatively bright ambient environment (i.e., a comparatively high ambient environmental illuminance), the visible light sensors can carry out satisfactory position detection. However, when the device is used in a state where a sensor output produced by reflected light of an object of sensing and a sensor output produced by environmental light are equal to each other, e.g., when the ambient environment becomes darker, it becomes impossible to use the reflection feature or shadow feature of the object of sensing for detection. Therefore, when only the visible light sensors are used, the touched part can no longer be detected.

However, the visible light sensors and the infrared light sensors are different in sensor output characteristic from each other even in the same ambient environment. Moreover, when the intensity of infrared light contained in outside light is comparatively low, the infrared light sensors can carry out satisfactory position detection. This makes it possible to carry out accurate position detection in a wider range of environmental illuminances by, as stated above, carrying out position detection with the visible light sensors if the intensity of infrared light in the environment is greater than or equal to the predetermined value and carrying out position detection with the infrared light sensors if the intensity of infrared light in the environment is less than the predetermined value.

The liquid crystal display device of the present invention is preferably configured to further include: a light intensity sensor for measuring the intensity of infrared rays in an environment where the liquid crystal display device is placed; and a sensor switching section which, if the intensity of infrared rays measured by the light intensity sensor is greater than or equal to a predetermined value, uses information obtained from the visible light sensors as position information and which, if the intensity of infrared rays measured by the light intensity sensor is less than the predetermined value, uses information obtained from the infrared light sensors as position information.

The foregoing configuration makes it possible to carry out accurate position detection in a wider range of environmental illuminances by carrying out position detection with the visible light sensors if the intensity of infrared light in the environment is greater than or equal to the predetermined value and carrying out position detection with the infrared light sensors if the intensity of infrared light in the environment is less than the predetermined value.

Further, the foregoing configuration allows the sensor switching section to choose, according to ambient illuminances, between extracting information from the visible light sensors as position information and extracting information from the infrared light sensors as position information. This makes it possible to use one coordinate extraction circuit to detect position information from the two types of sensors, namely the visible light sensors and the infrared light sensors, thus achieving a reduction in circuit scale. Further, the foregoing configuration makes it unnecessary to read out information from the visible light sensors and the infrared light sensors separately as position information, thus achieving a decrease in amount of information to be processed. This makes it possible to keep both the cost of the device and power consumption low.

The liquid crystal display device is preferably configured such that the predetermined value of intensity of infrared light falls within a range of 1.00 to 1.80 mW/cm$^2$, based on the integrated radiant intensity of light at wavelengths of 800 to 1,000 nm.

The foregoing configuration makes it possible to carry out satisfactory position detection regardless of the value of intensity of infrared light by carrying out position detection with the visible light sensors if the intensity of infrared light in the environment takes on a comparatively high value greater than or equal to those in the above range and by carrying out position detection with the infrared light sensors if the intensity of infrared light in the environment takes on a comparatively low value less than those in the above range. This makes it possible to carry out satisfactory position detection regardless of the type of light with which the device is irradiated, such as sunlight or fluorescent light.

The liquid crystal display device is preferably configured such that: if the illuminance of an environment where the liquid crystal display device is placed is greater than or equal to a predetermined value, the position detecting section carries out position detection by using the visible light sensors; and if the illuminance of an environment where the liquid crystal display device is placed is less than the predetermined value, the position detecting section carries out position detection by using the infrared light sensors.

Usually, in the case of a comparatively bright ambient environment (i.e., a comparatively high ambient environmental illuminance), the visible light sensors can carry out satisfactory position detection. However, when the device is used in a state where a sensor output produced by reflected light of an object of sensing and a sensor output produced by environmental light are equal to each other, e.g., when the ambient environment becomes darker, it becomes impossible to use the reflection feature or shadow feature of the object of sensing for detection. Therefore, when only the visible light sensors are used, the touched part can no longer be detected.

However, the visible light sensors and the infrared light sensors are different in sensor output characteristic from each other even in the same ambient environment. This makes it possible to carry out accurate position detection in a wider range of environmental illuminances by, as stated above, carrying out position detection with the visible light sensors if the environmental illuminance is comparatively bright taking on a value greater than or equal to the predetermined value and carrying out position detection with the infrared light sensors if the environmental illuminance is comparatively dark taking on a value less than the predetermined value.

The liquid crystal display device is preferably configured to further include: an illuminance sensor for measuring the illuminance of an environment where the liquid crystal display device is placed; and a sensor switching section which, if the illuminance measured by the illuminance sensor is greater than or equal to a predetermined value, uses information obtained from the visible light sensors as position information and which, if the illuminance measured by the illuminance sensor is less than the predetermined value, uses information obtained from the infrared light sensors as position information.

The foregoing configuration makes it possible to carry out accurate position detection in a wider range of environmental illuminances by carrying out position detection with the visible light sensors if the illuminance of the environment is comparatively bright taking on a value greater than or equal to the predetermined value and carrying out position detection with the infrared light sensors if the illuminance of the environment is comparatively dark taking on a value less than the predetermined value.

Further, the foregoing configuration allows the sensor switching section to choose, according to ambient illuminances, between extracting information from the visible light sensors as position information and extracting information from the infrared light sensors as position information. This makes it possible to use one coordinate extraction circuit to detect position information from the two types of sensors, namely the visible light sensors and the infrared light sensors, thus achieving a reduction in circuit scale. Further, the foregoing configuration makes it unnecessary to read out information from the visible light sensors and the infrared light sensors separately as position information, thus achieving a decrease in amount of information to be processed. This makes it possible to keep both the cost of the device and power consumption low.

The liquid crystal display device is preferably configured such that: the visible light sensors and the infrared light sensors are disposed in rows and columns in a matrix pattern in keeping with an array of pixels provided in the liquid crystal panel; and the visible light sensors and the infrared light sensors are disposed alternately in a checkered pattern.

According to the foregoing configuration, a decrease in resolution due to the provision of the two types of light sensors can be minimized in comparison with the resolution of an area sensor constituted by only light sensors of one type, with the total number of light sensors unchanged.

Advantageous Effects of Invention

An area sensor according to the present invention includes: a position detecting section, provided with visible light sensors each containing light sensor elements that detect the intensity of received visible light and infrared light sensors each containing light sensor elements that detect the intensity of received infrared light, which detects an input position by the visible light sensors and the infrared light sensors separately detecting an image on the detector surface; and a light-emitting section for irradiating the position detecting section with light containing infrared light from behind.

The area sensor of the present invention can carry out satisfactory position detection in a wider range of environmental illuminances than a conventional area sensor simply using two types of sensors of different light sensitivities.

Further, a liquid crystal display device of the present invention includes: a position detecting section, provided with visible light sensors each containing light sensor elements that detect the intensity of received visible light and infrared light sensors each containing light sensor elements that detect the intensity of received infrared light, which detects an input position by the visible light sensors and the infrared light sensors separately detecting an image on the detector surface; and a backlight for irradiating the liquid crystal panel with light containing infrared light.

As such, the liquid crystal display device of the present invention can carry out satisfactory position detection in a wider range of environmental illuminances than a liquid crystal display device equipped with conventional area sensor simply using two types of sensors of different light sensitivities.

BRIEF DESCRIPTION OF DRAWINGS

FIG. 4 is a schematic view showing the configuration of each sensor B (infrared light sensor) provided in the liquid crystal panel shown in FIG. 1.

FIG. 7 includes (a) a graph showing the light transmittance of an optical filter having a structure shown in (b) of FIG. 5 as a function of wavelength; and (b) a graph showing the light transmittance of an optical filter having a structure shown in (d) of FIG. 5 as a function of wavelength.

FIG. 11 includes: (a) a schematic view showing a target range of illuminances suitable for the sensors A to carry out detection; (b) a schematic view showing a target range of illuminances suitable for the sensors B to carry out detection; and (c) a schematic view showing a target range of illuminances suitable for both the sensors A and B to carry out detection.

FIG. 15 is a plan view showing the configuration of each sensor in a liquid crystal panel provided in the liquid crystal display device shown in FIG. 14.

DESCRIPTION OF EMBODIMENTS

[Embodiment 1]

An embodiment of the present invention is described below with reference to FIGS. 1 through 13. It should be noted that the present invention is not limited to this.

The present embodiment describes a touch-panel-integrated liquid crystal display device having an area sensor function (specifically, a touch panel function).

First, the configuration of a touch-panel-integrated liquid crystal display device of the present embodiment is described with reference to FIG. 2. A touch-panel-integrated liquid crystal display device 100 shown in FIG. 2 (also simply called "liquid crystal display device 100") has a touch panel function of detecting the position of an input through detection of an image on a surface of a display panel by a light sensor element provided in each pixel.

Figure 2:
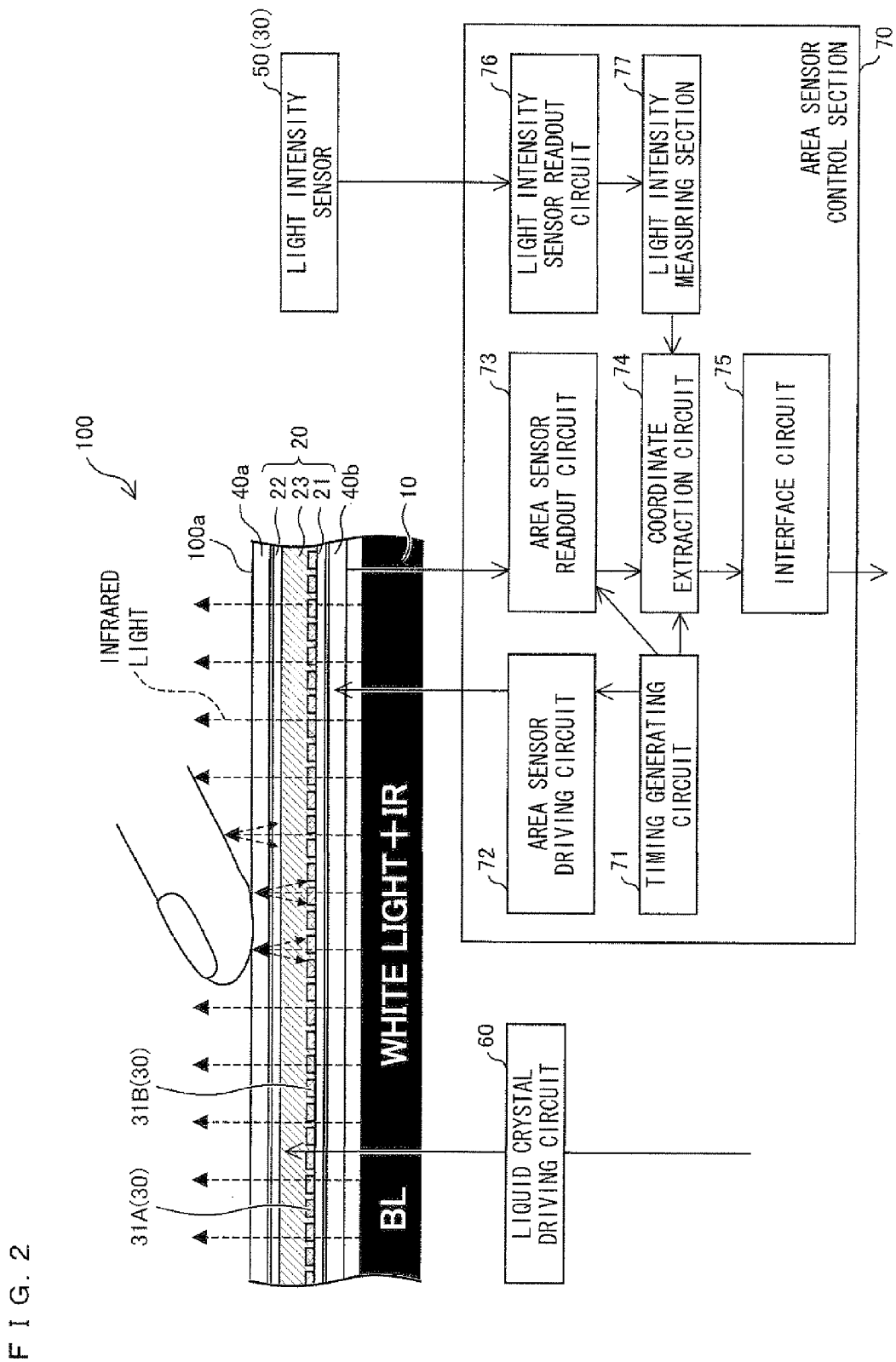
FIG. 2 is a schematic view showing the configuration of a liquid crystal display device according to a first embodiment of the present invention.

As shown in FIG. 2, the touch-panel-integrated liquid crystal display device 100 of the present embodiment includes: a liquid crystal panel 20 (position detecting section); and a backlight 10 (light-emitting section), provided toward a back surface of the liquid crystal panel 20, which irradiates the liquid crystal panel with light.

The liquid crystal panel 20 includes: an active matrix substrate 21 having a large number of pixels arrayed in a matrix pattern; a counter substrate 22 disposed opposite the active matrix substrate 21; and a liquid crystal layer 23, sandwiched between the two substrates, which serves as a display medium. It should be noted that in the present embodiment, the liquid crystal panel 20 is not limited to any particular display mode and can adopt any display mode such as the TN mode, the IPS mode, the VA mode, etc.

Further, on outer sides of the liquid crystal panel 20, there are provided a front-side polarizing plate 40a and a back-side polarizing plate 40b, respectively, with the liquid crystal panel 20 sandwiched therebetween.

Each of the polarizing plates 40a and 40b plays a role as a polarizer. For example, in cases where a liquid material sealed in the liquid crystal layer is of a vertical alignment type, a normally black mode liquid crystal display device can be achieved by disposing the front-side polarizing plate 40 and the back-side polarizing plate 40b so that their respective directions of polarization are in a crossed Nicols relationship with each other.

The active matrix substrate 21 is provided with TFTs (not illustrated) serving as switching elements for driving the pixels, an alignment film (not illustrated), visible light sensors 31A, infrared light sensors 31B, a light intensity sensor (illuminance sensor) 50, etc. The visible light sensors 31A, the infrared light sensors 31B, and the light intensity sensor 50 are configured to contain light sensor elements 30 provided in their respective pixel regions.

Further, the counter substrate 22 is provided, albeit not illustrated, with a color filter layer, a counter electrode, an alignment film, etc. The color filter layer is constituted by a coloring section having red (R), green (G), and blue (B) and a black matrix.

As mentioned above, the touch-panel-integrated liquid crystal display device 100 of the present embodiment has light sensor elements 30 provided in their respective pixel regions, whereby the visible light sensors 31A and the infrared light sensors 31B are formed. By the visible light sensors 31A and the infrared light sensors 31B separately detecting an image on the panel surface, an area sensor is achieved which detects the position of an input from an outside source. Moreover, it is possible to, when a finger or input pen makes contact with a specific position on the surface (detector surface 100a) of the liquid crystal panel 20, have the light sensor elements 30 read that position, to input information into the device, and to execute an intended operation. Thus, in the touch-panel-integrated liquid crystal display device 100 of the present embodiment, the touch panel function can be achieved by the light sensor elements 30.

Each of the light sensor elements 30 is formed by a photodiode or a phototransistor and detects the amount of received light by passing therethrough a current corresponding to the intensity of the received light. The TFTs and the light sensor elements 30 may be those formed monolithically by substantially the same process on the active matrix substrate 21. That is, some of the components of each of the light sensor elements 30 may be formed at the same time as some of the components of each of the TFTs. Such a method for forming light sensor elements can be carried out according to a conventionally publicly known method for manufacturing a liquid crystal display device having light sensor elements built-in.

The light intensity sensor 50 serves to measure the intensity of outside light in an environment where the liquid crystal display device 100 is placed (such an intensity being referred to as "environmental light intensity"). In the present embodiment, the light intensity sensor 50 is constituted by light sensor elements 30 identical in configuration to those light sensor elements 30 constituting the area sensor. The configuration of the light intensity sensor 50 will be specifically described later.

The backlight 10 serves to irradiate the liquid crystal panel 20 with light but, in the present embodiment, the backlight 10 irradiates the liquid crystal panel 20 with infrared light in addition to white light. Such a backlight that emits light containing infrared light can be achieved by a publicly known method.

Further, although not shown in FIG. 2, there may be provided a front-side phase plate and a back-side phase plate as optical compensation elements on an outer side of the active matrix substrates 21 and an outer side of the counter substrate 22, respectively, in the liquid crystal display device of the present invention.

Further, FIG. 2 shows a liquid crystal driving circuit 60 that drives the liquid crystal panel 20 to carry out a display and an area sensor control section 70 for driving the area sensor. FIG. 2 also shows internal components of the area sensor control section 70. It should be noted that the configuration of the liquid crystal driving circuit of the present embodiment thus applied may be that which have conventionally been publicly known.

As shown in FIG. 2, the area sensor control section 70 includes a timing generating circuit 71, an area sensor driving circuit 72, an area sensor readout circuit 73, a coordinate extraction circuit 74, an interface circuit 75, a light intensity sensor readout circuit 76, and a light intensity measuring section 77.

The timing generating circuit 71 generates timing signals for controlling the circuits so that they operate in synchronization with each other.

The area sensor driving circuit 72 supplies a power source for driving the light sensor elements 30.

The area sensor readout circuit 73 receives received-light signals from the light sensor elements 30 that pass therethrough currents of different values depending on the amount of received light, and calculates the amount of received light from the value of a current thus obtained.

The coordinate extraction circuit 74 calculates, in accordance with the amount of light received by the light sensor elements 30 as calculated by the area sensor readout circuit 73, the coordinates of a finger touching the surface (detector surface 100a) of the liquid crystal panel.

The interface circuit 75 outputs information on the coordinates of the finger as calculated by the coordinate extraction circuit 74 (position information) to the outside of the liquid crystal display device 100. The liquid crystal display device 100 is connected to a PC or the like through the interface circuit 75.

The light intensity sensor readout circuit 76 receives received-light signals from the light sensor elements 30 contained in the light intensity sensor 50, and calculates the amount of received light from the value of a current thus obtained.

The light intensity measuring section 77 calculates the light intensity of an environment where the device is placed (specifically the intensity, illuminance (brightness), etc. of infrared rays) in accordance with the amount of light received by the light sensor elements 30 as calculated by the light intensity sensor readout circuit 76. Based on the environmental light intensity thus obtained, the coordinate extraction circuit 74 decides whether it extracts received-light signals from the light sensor elements 30 contained in the visible light sensors 31A or from those contained in the infrared light sensors 31B, thereby making it possible to separately use the visible light sensors 31A and the infrared light sensors 31B properly for different ambient environmental light intensities.

Although not illustrated, the area sensor control circuit 70 also includes a driving circuit for driving those light sensor elements 30 constituting the light intensity sensor. Further, since, in the present embodiment, those light sensor elements constituting the area sensor and those constituting the light intensity sensor can be manufactured by the same design and process (manufacturing process), the area sensor driving circuit 72 can also be used as a driving circuit for driving those light sensor elements 30 constituting the light intensity sensor.

By having such a configuration, the liquid crystal display device 100 allows the light sensor elements 30 formed in the liquid crystal panel 20 to detect the position of an input by capturing as an image a finger or input pen touching the surface (detector surface 100a) of the device.

In the following, the configurations of the sensors (visible light sensors 31A, the infrared light sensors 31B, and the light intensity sensor 50) provided in the liquid crystal panel 20 are described. In the following description, the visible light sensors 31A are referred to as "sensors A", and the infrared light sensors 31B are referred to as "sensors B".

Figure 1:
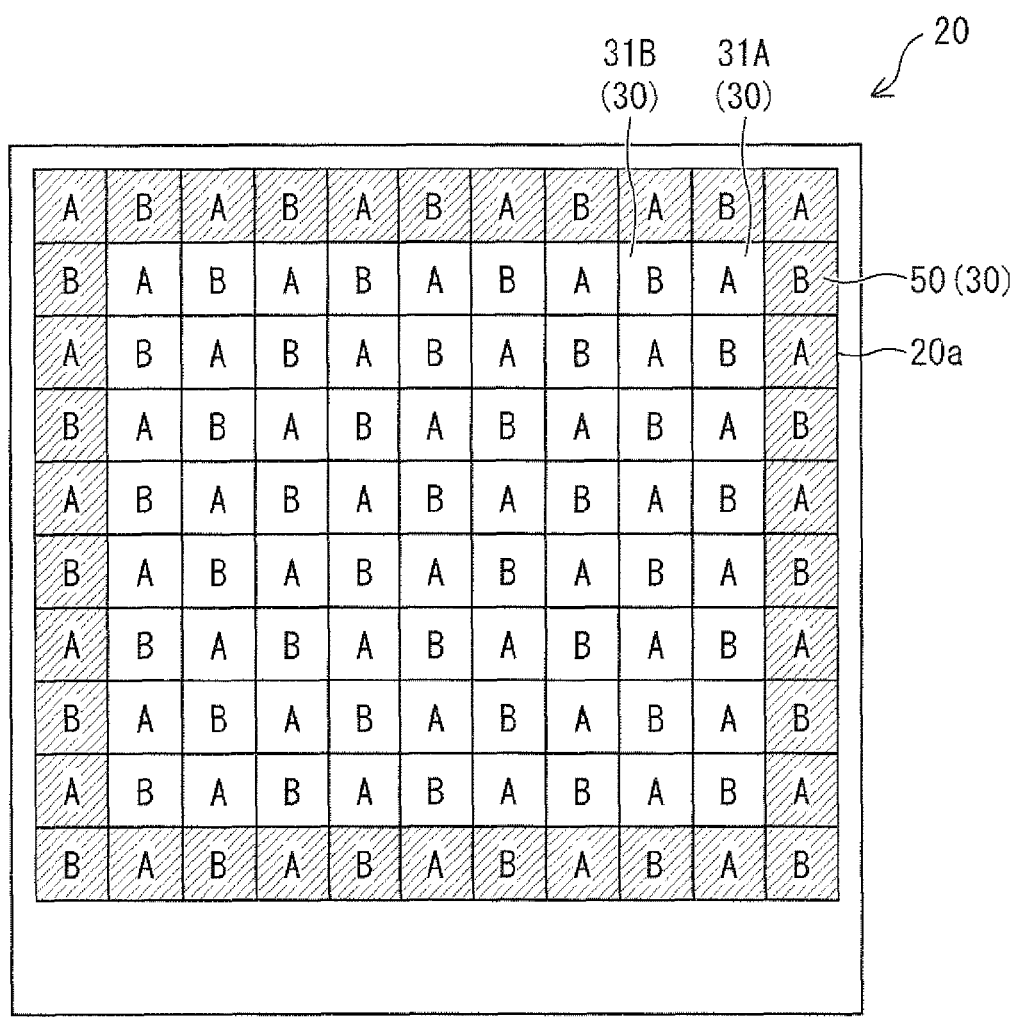
FIG. 1 is a plan view showing the configuration of each sensor in a liquid crystal panel provided in a liquid crystal display device shown in FIG. 2.

FIG. 1 schematically shows the configuration of each sensor in a display region (active area) 20a of the liquid crystal panel 20. Although FIG. 1 does not specifically show an internal configuration of the liquid crystal panel 20, the liquid crystal panel 20 has a plurality of data signal lines and a plurality of gate signal lines disposed therein in such a way as to intersect with each other, and has pixel electrodes disposed near the intersections with TFTs interposed therebetween. Further, the color filter layer provided to the counter substrate 22 in the liquid crystal panel 20 has a red (R), green (G), and blue (B) coloring section, formed in a position facing the pixel electrodes, which makes the pixel electrodes red, green, and blue. Each pixel is constituted by three pixel electrodes, namely an R pixel electrode, a G pixel electrode, and a B pixel electrode. In this way, the liquid crystal panel 20 has a plurality of pixels disposed therein in rows and columns in a matrix pattern.

In the liquid crystal panel 20 of the present embodiment, as shown in FIG. 1, those light sensor elements 30 provided in those pixels disposed in an outermost peripheral region within the display region 20a are used as the light intensity sensor 50.

Further, those pixels in a region other than the outermost peripheral region within the display region 20a are also provided with light sensor elements 30, and each of these light sensor elements constitutes either a sensor A or a sensor B. As shown in FIG. 1, the sensors A and B are disposed in rows and columns in a matrix pattern in keeping with the array of pixels. Furthermore, in the present embodiment, the sensors A and B are disposed alternately in a checkered pattern.

Figure 3:
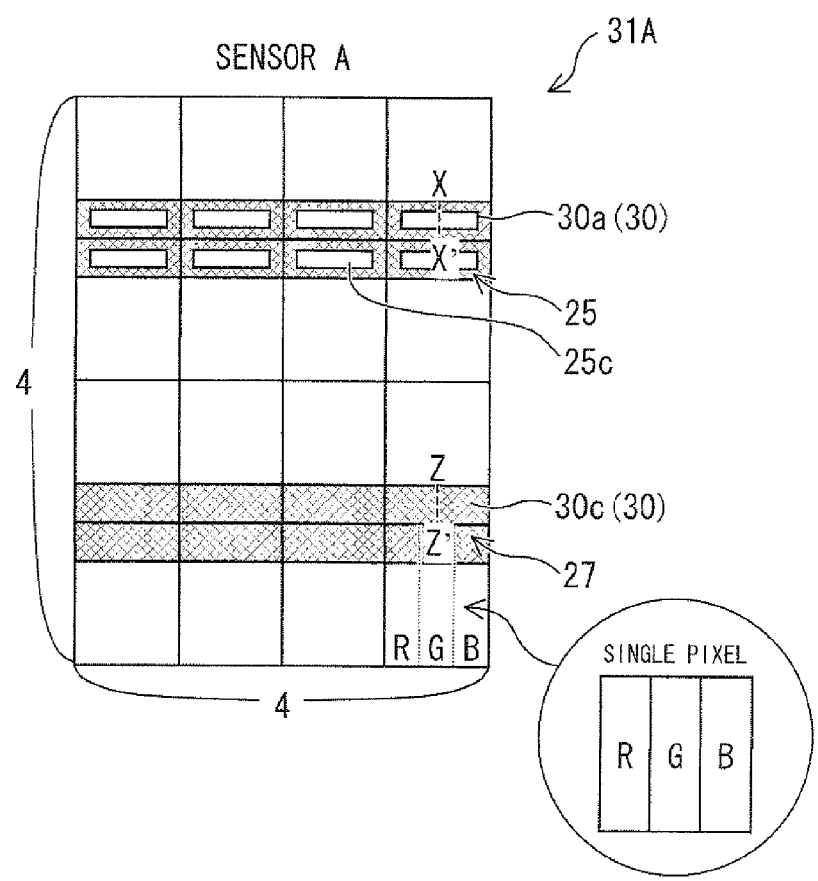
FIG. 3 is a schematic view showing the configuration of each sensor A (visible light sensor) provided in the liquid crystal panel shown in FIG. 1.

FIG. 3 shows the configuration of each of the sensors A in more detail. Further, FIG. 4 shows the configuration of each of the sensors B in more detail. As shown in these drawings, each unit of sensor A contains a total of sixteen pixels, i.e., four pixels by four pixels, so does each unit of sensor B. It should be noted that, as mentioned above, each pixel is constituted by three pixel electrodes, namely an R pixel electrode, a G pixel electrode, and a B pixel electrode.

As shown in FIG. 3, the sensor A contains a plurality of light sensor elements 30 categorized into two types of light sensor elements, namely light sensor elements 30a that detect the intensity of received visible light and dark-current-compensating light sensor elements 30c for making temperature compensation for the light sensor elements 30a.

Further, as shown in FIG. 4, the sensor B contains a plurality of light sensor elements 30 categorized into two types of light sensor elements, namely light sensor elements 30b that detect the intensity of received infrared light and dark-current-compensating light sensor elements 30c for making temperature compensation for the light sensor elements 30b.

The term "dark-current-compensating light sensor element 30c" here means a compensating sensor, provided to compensate for the detection characteristic of a light sensor that varies according to external factors such as temperature, which serves to improve the precision of the sensor. The dark-current-compensating light sensor elements 30c can be formed by using a conventional publicly known technique. The light sensor elements 30 contained in the sensor A and those contained in the sensor B have identical structures.

Figure 5:
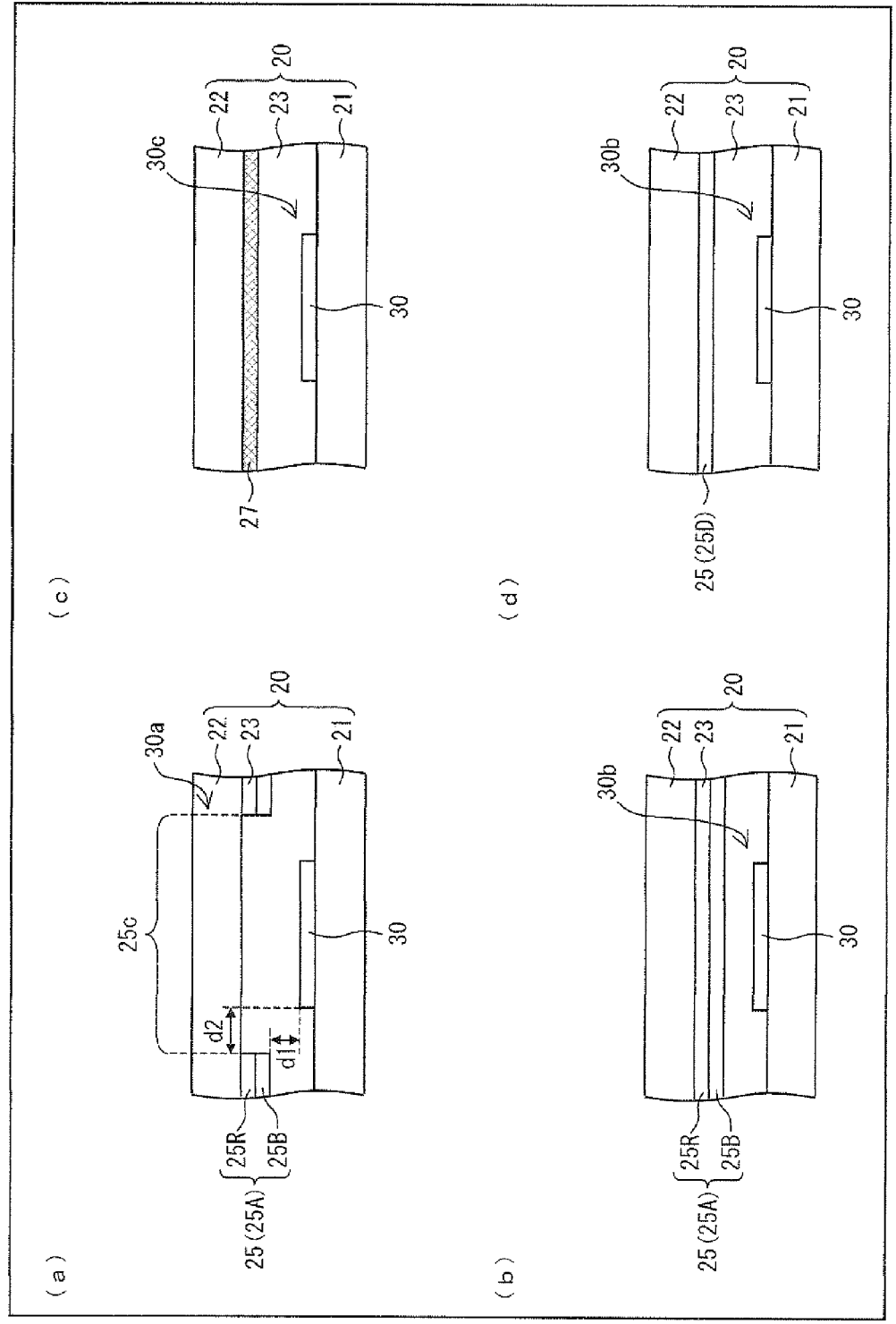
FIG. 5 includes: (a) a cross-sectional view showing the configuration of the visible light sensor as taken along line X-X' in FIG. 3; (b) a cross-sectional view showing the configuration of the infrared light sensor as taken along line Y-Y' in FIG. 4; (c) a cross-sectional view showing the configuration of the visible light sensor or of the infrared light sensor as taken along line Z-Z' in FIG. 3 or 4; (d) a cross-sectional view showing the configuration of an infrared light sensor as taken along line Y-Y' in FIG. 4, the infrared light sensor having a different structure from that shown in (b) of FIG. 5.

(a) through (c) of FIG. 5 show a cross-sectional configuration of such a light sensor element 30a, a cross-sectional configuration of such a light sensor element 30b, and a cross-sectional configuration of such a light sensor element 30c, respectively. That is, (a) through (c) of FIG. 5 show a cross-sectional configuration of the visible light sensor 31A as taken along line X-X' in FIG. 3, a cross-sectional configuration of the infrared light sensor 31B as taken along line Y-Y' in FIG. 4, and a cross-sectional configuration of the visible light sensor 31A or of the infrared light sensor 31B as taken along line Z-Z', respectively.

Further, (d) of FIG. 5 shows another example configuration of a light sensor element 30b. In (d) of FIG. 5, too, a cross-sectional configuration of an infrared light sensor 31B as taken along line Y-Y' in FIG. 4 is shown, as in the case of the light sensor element 30b shown in (b) of FIG. 5.

The light sensor element 30a shown in (a) of FIG. 5 has a light sensor element 30 formed on the active matrix substrate 21. The configuration of the light sensor element 30a to detect the intensity of visible light may be identical to that of a light sensor element provided in a conventional touch-panel-integrated liquid crystal display device.

As with the light sensor element 30a, the light sensor element 30b shown in (b) of FIG. 5 has a light sensor element 30 formed on the active matrix substrate 21. Moreover, the light sensor element 30b is provided with an optical filter 25 (25A) for blocking visible light, and the optical filter 25A is located in a position corresponding to a region in the light sensor element 30b where the light sensor element 30 is disposed, in such a way as to face the counter substrate 22. The optical filter 25A has a laminated structure of red and blue color filters 25R and 25B constituting the coloring section of the color filter layer. This makes it possible to block a visible light component of those components of light incident on the light sensor element 30.

In the present embodiment, as shown in (a) of FIG. 5, the light sensor element 30a is provided with an optical filter 25 located on a region in the counter substrate 22 where the light sensor element 30a is disposed, and the optical filter 25 is identical in structure to that provided on the light sensor element 30b. Provided directly above the light sensor element 30a is an opening 25c through which light (light at all wavelengths) is transmitted. Such provision of the sensor A with an optical filter 25 makes it possible to prevent the occurrence of a difference in appearance of a display between a pixel having the sensor A and a pixel having the sensor B.

It should be noted here that it is preferable that if d1 is the distance between the optical sensor element 30 and the optical filter 25 along the direction of lamination of each layer on the substrate, the distance d2 between an edge of the optical sensor element 30 and an edge of the optical filter 25 (edge of the opening 25c) along a surface of the substrate take on a value greater than or equal to:

$$d2=d1+\alpha,$$

where $\alpha$ is a value (distance) obtained by adding a lamination tolerance between the active matrix substrate 21 and the counter substrate 22 to a finished dimensional tolerance between the light sensor element 30 and the optical filter 25. This makes it possible to surely prevent the light sensor element 30 and the optical filter 25 from being overlapped with each other in the sensor A as seen from the panel surface.

As with the light sensor element 30a, the light sensor element 30c shown in (c) of FIG. 5 has a light sensor element 30 formed on the active matrix substrate 21. However, the light sensor element 30c is configured differently from the light sensor element 30a, i.e., is provided with a black matrix 27 for blocking light, and the black matrix 27 is located in a position corresponding to a region in the light sensor element 30c where the light sensor element 30 is disposed, in such a way as to face the counter substrate 22. This allows a current induced by the intensity of light to be eliminated from an induced current that is obtained from the light sensor element 30c, thus making it possible to detect a current induced by a factor other than the intensity of light (e.g., temperature). Moreover, the light sensor elements 30a and 30b can be corrected by subtracting a value detected by the light sensor element 30c from values detected by the light sensor elements 30a and 30b, respectively.

Further, as with the light sensor element 30a, the light sensor element 30b shown in (d) of FIG. 5 has a light sensor element 30 formed on the active matrix substrate 21. However, the light sensor element 30b is configured differently from the light sensor element 30a, i.e., is provided with an optical filter 25D for blocking visible light, and the optical filter 25D is located in a position corresponding to a region in the light sensor element 30b where the light sensor element 30 is disposed, in such a way as to face the counter substrate 22. The optical filter 25D is made of a mixture of a red pigment, a green pigment, and a blue pigment. This makes it possible to block a visible light component of those components of light incident on the light sensor element 30.

In the liquid crystal panel 20 of the present embodiment, as described above, the two types of sensor, namely the sensors A and B, are achieved by providing or not providing an optical filter 25A (or an optical filter 25D) on each of the light sensor elements 30 identical in configuration to conventional ones (i.e., by providing or not providing an opening 25c in the optical filter 25 formed on the light sensor element 30). This point is discussed with reference to FIGS. 6 through 8.

Figure 6:
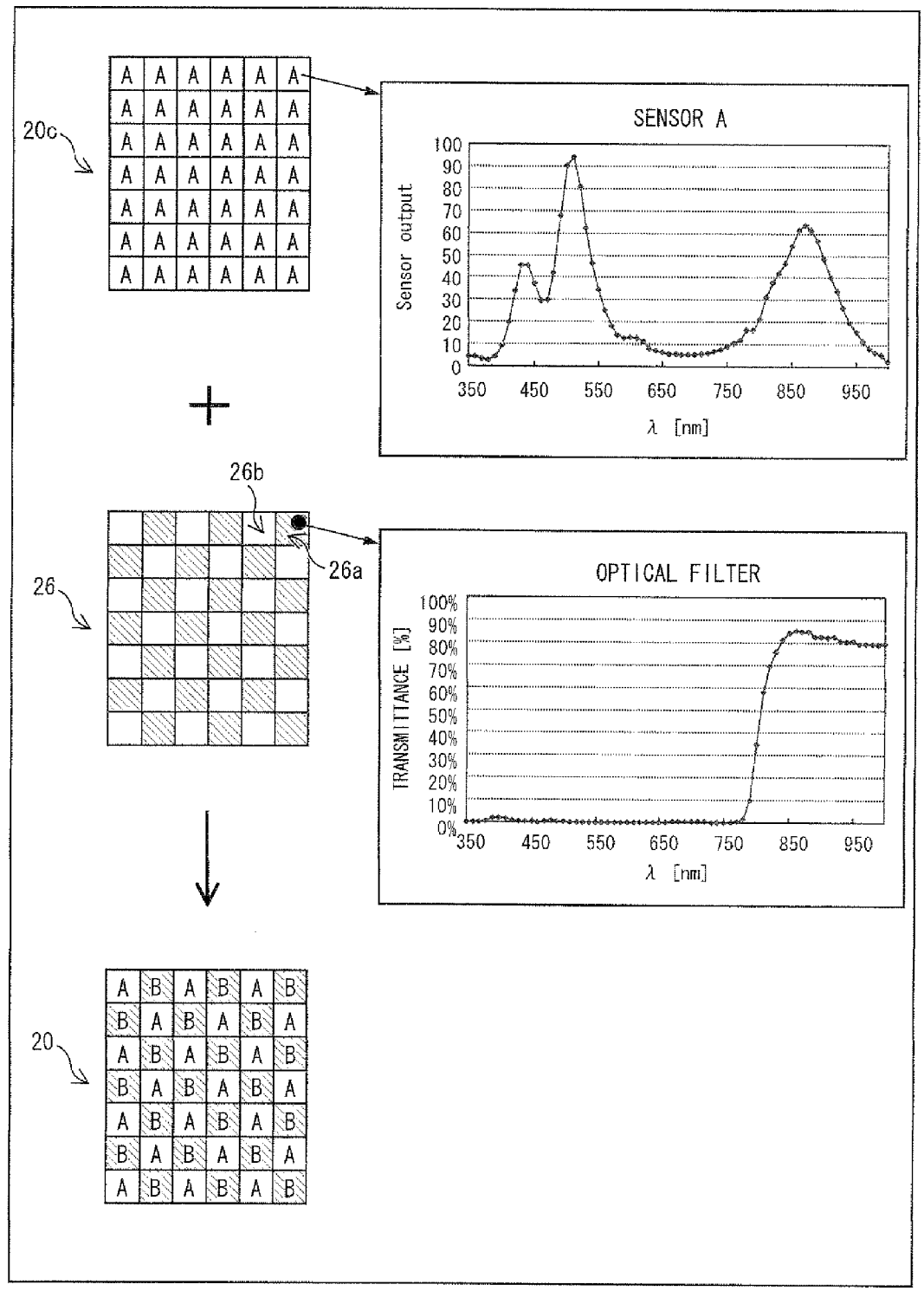
FIG. 6 is a schematic view for explaining the configuration of the liquid crystal panel shown in FIG. 1.

FIG. 6 shows an example where a liquid crystal panel of the present embodiment is achieved by a combination of a liquid crystal panel 20c provided with sensors A and an optical filter structure 26. A graph shown in an upper right portion of FIG. 6 shows the spectral sensitivity (sensor output as a function of wavelength) of each of the sensors A, and a graph shown in a right middle portion of FIG. 6 shows the spectral transmittance (light transmittance as a function of wavelength) of each visible light blocking section 26a provided in the optical filter structure 26.

The liquid crystal panel 20c is configured such that the sensors A (visible light sensors) are disposed in rows and columns in a matrix pattern. It should be noted that each of the sensors A has a certain level of sensitivity at all wavelengths from visible light to infrared light as shown in the upper right graph.

Further, the optical filter structure 26 shown in FIG. 6 is configured to have its visible light blocking sections 26a and visible light transmitting sections 26b disposed alternately in a checkered pattern. The visible light blocking sections 26a and the visible light transmitting sections 26b are identical in planar shape and size to the sensors A.

The graph shown in the right middle portion of FIG. 6 shows the spectral transmittance in each of the visible light blocking sections 26a of the optical filter structure 26. As shown in this graph, the visible light blocking section 26a blocks visible light (i.e., light having a wavelength of 780 nm or shorter). The visible light blocking section 26a can be made of any material that has such properties as to block visible light (i.e., light having a wavelength of 780 nm or shorter) and transmit infrared light.

Specific examples of the structure of the visible light blocking section 26a include a laminate of a red color filter 25R and a blue color filter 25B as in the case of the optical filter 25A described above, an optical filter made of a mixture of a red pigment, a green pigment, and a blue pigment as in the case of the optical filter 25D described above, and the like.

The optical filter 25A makes it possible to surely block visible light by combining red and blue color filers. Further, in addition to this, the optical filter 25A has such an advantage that the optical filter structure 26 can be incorporated into the color filter layer provided in the counter substrate 22 of the liquid crystal panel 20.

Further, the optical filer 25D can be made more highly capable of blocking visible light than the optical filter 25A obtained by laminating color filters. This point is discussed with reference to FIG. 7. (a) of FIG. 7 shows the spectral transmittance of such an optical filter 25A, and (b) of FIG. 7 shows the spectral transmittance of such an optical filter 25D.

As shown in (a) of FIG. 7, the optical filter 25A, constituted by laminating a red color filter 25R and a blue color filter 25B, exhibits high light transmittances in a visible light range of wavelengths from 350 nm to 500 nm and in a visible light range near a wavelength of 700 nm (i.e., in those parts surrounded by dotted lines in (a) of FIG. 7) and therefore is found to be unable to sufficiently block these ranges of wavelengths of visible light. On the other hand, as shown in (b) of FIG. 7, the optical filter 25D, made of a mixture of R, G, and B pigments, can more greatly reduce leakage of light in the visible range than the optical filter 25A. Further, since the optical filter 25D is a filter made of a mixture of pigments of those colors which are used for color filters, the optical filter 25D can be made smaller in film thickness than a laminate of R, G, and B color filters.

Each of the visible light transmitting sections 26b of the optical filter 26 has openings formed in positions corresponding to light-receiving sections of the light sensor elements 30a of a sensor A corresponding to that visible light transmitting section 26b. This allows the light-receiving sections of the light sensor elements 30a to receive light at all wavelengths. It should be noted that a region in the visible light transmitting section 26b other than the openings is formed by an optical filter identical in structure to the visible light blocking sections 26a.

Figure 13:
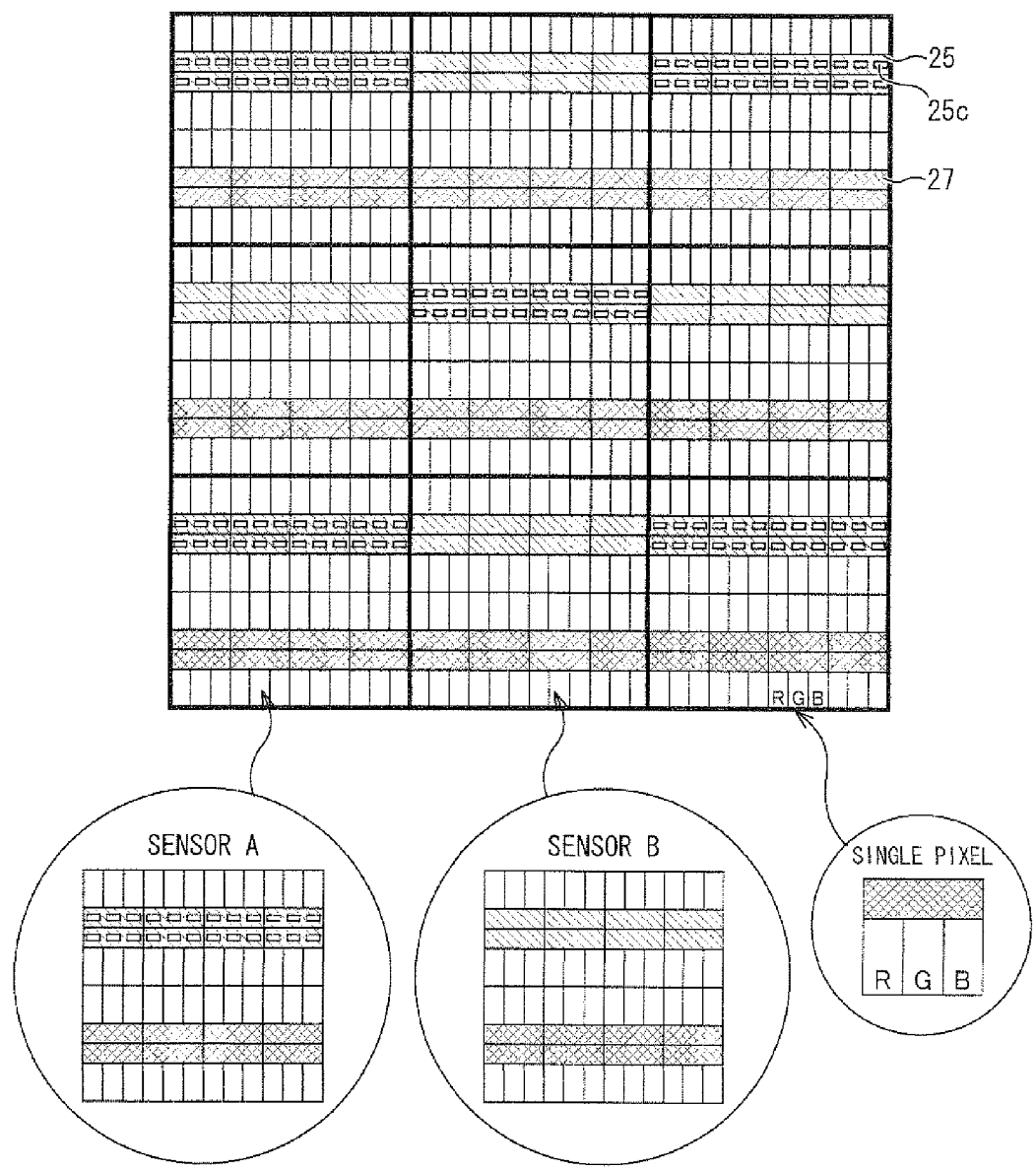
FIG. 13 is a schematic view showing an example of the structure of a liquid crystal panel having its sensors A and B disposed alternately in a checkered pattern.

FIG. 13 schematically shows a structure where sensors A having optical filters 25 provided with openings 25c and sensors B having optical filters 25 provided with no openings are disposed alternately.

By inserting the optical filter structure 26 into the liquid crystal panel 20c, a liquid crystal panel 20 is obtained which has its sensors A and B disposed alternately in a checkered pattern as shown in FIG. 6. (a) of FIG. 8 shows the spectral sensitivity of the sensors A of the liquid crystal panel 20 shown in FIG. 6, and (b) of FIG. 8 shows the spectral sensitivity of the sensors B of the liquid crystal panel 20 shown in FIG. 6.

Figure 8:
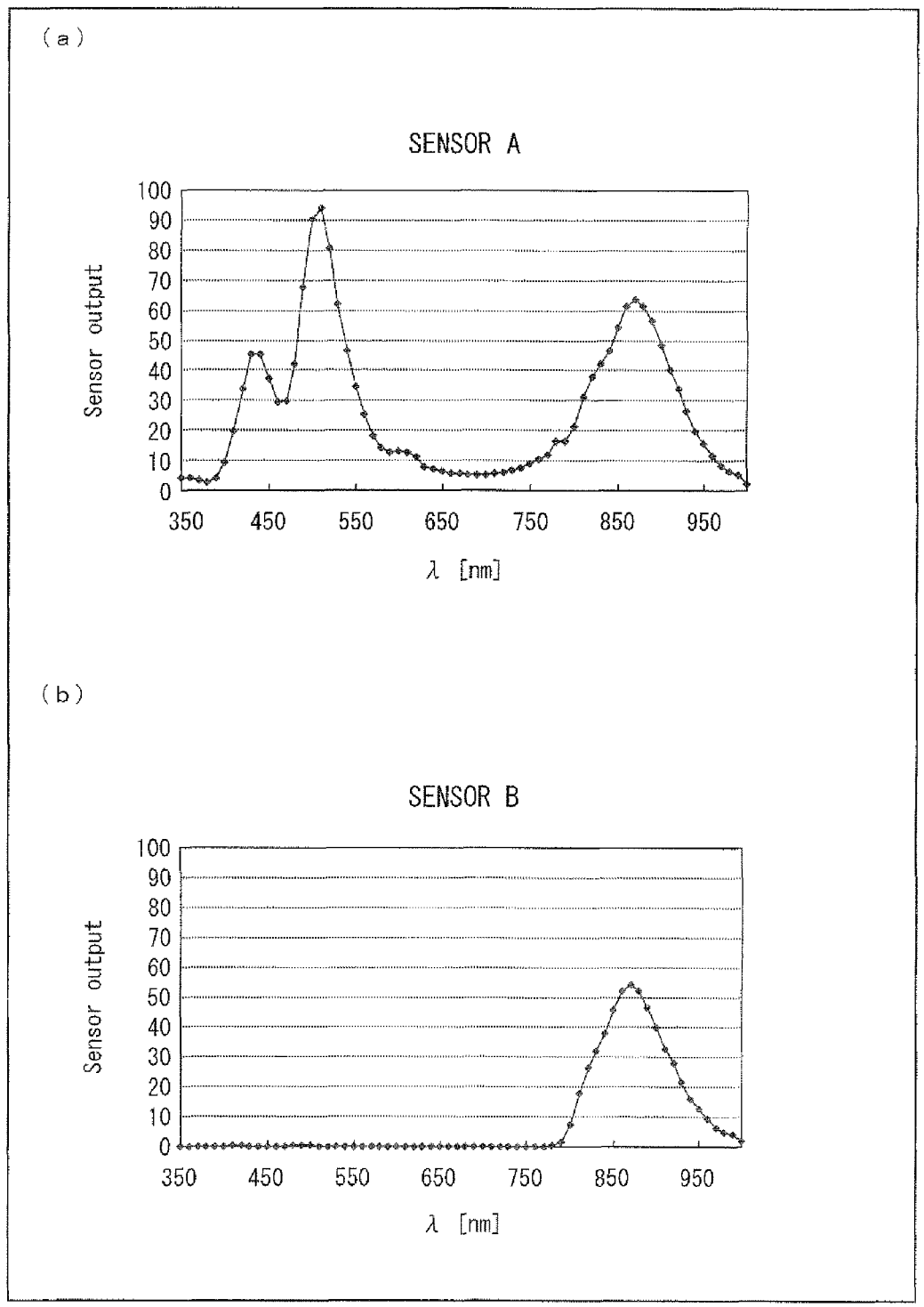
FIG. 8 includes (a) a graph showing the spectral sensitivity (sensor output as a function of wavelength) of the sensors A of the liquid crystal panel 20 shown in FIG. 6; and (b) a graph showing the spectral sensitivity (sensor output as a function of wavelength) of the sensors B of the liquid crystal panel 20 shown in FIG. 6.

As shown in (a) of FIG. 8, the sensors A respond to visible and infrared ranges of wavelengths and therefore are found to be able to detect the intensity of light containing both visible light and infrared light. Further, as shown in (b) of FIG. 8, the sensors B respond only to an infrared range of wavelengths and therefore are found to be able to detect the intensity of infrared light.

The liquid crystal panel 20 thus configured allows the two types of light sensors, namely the sensors A and B, to separately detect an image on the panel surface. That is, the liquid crystal panel 20 can detect an input position by two types of method, i.e., can detect an input position by using the touch panel function fulfilled by the sensors A and detect the input position by using the touch panel function fulfilled by the sensors B.

In the following, the light intensity sensor 50, which is a third type of sensor provided in the liquid crystal panel 20, is described.

As shown in FIG. 1, the liquid crystal panel 20 of the present embodiment has the light intensity sensor 50 disposed in the outermost peripheral region of its display region 20a. That is, the light intensity sensor 50 is constituted by those light sensor elements 30 formed in outermost peripheral ones of the pixels disposed in rows and columns in a matrix pattern within the display region. Moreover, the light intensity sensor 50 is disposed in such a way as to surround the sensors A and B disposed in a matrix pattern.

Thus, in the present embodiment, the light intensity sensor 50 is constituted by the plurality of light sensor elements 30 disposed in the outermost peripheral region of the display region, and an average of the amounts of light received by those light sensor elements 30 constituting the light intensity sensor 50 is taken to be calculated as an environmental light intensity.

The light sensitivity of the light intensity sensor 50 of the present embodiment is 1/n (where n is any number that is greater than 1) of the light sensitivity of the visible light sensors 31A provided in the display region. This allows the light intensity sensor 50 to be lower in output than the visible light sensors 31A and have its sensor output saturated at a light intensity higher than the light intensity at which the visible light sensors 31A have their output saturated. This makes it possible to accurately measure a wide range of environmental light intensities without having a sensor output saturated in a range of light intensities to be measured.

Figure 9:
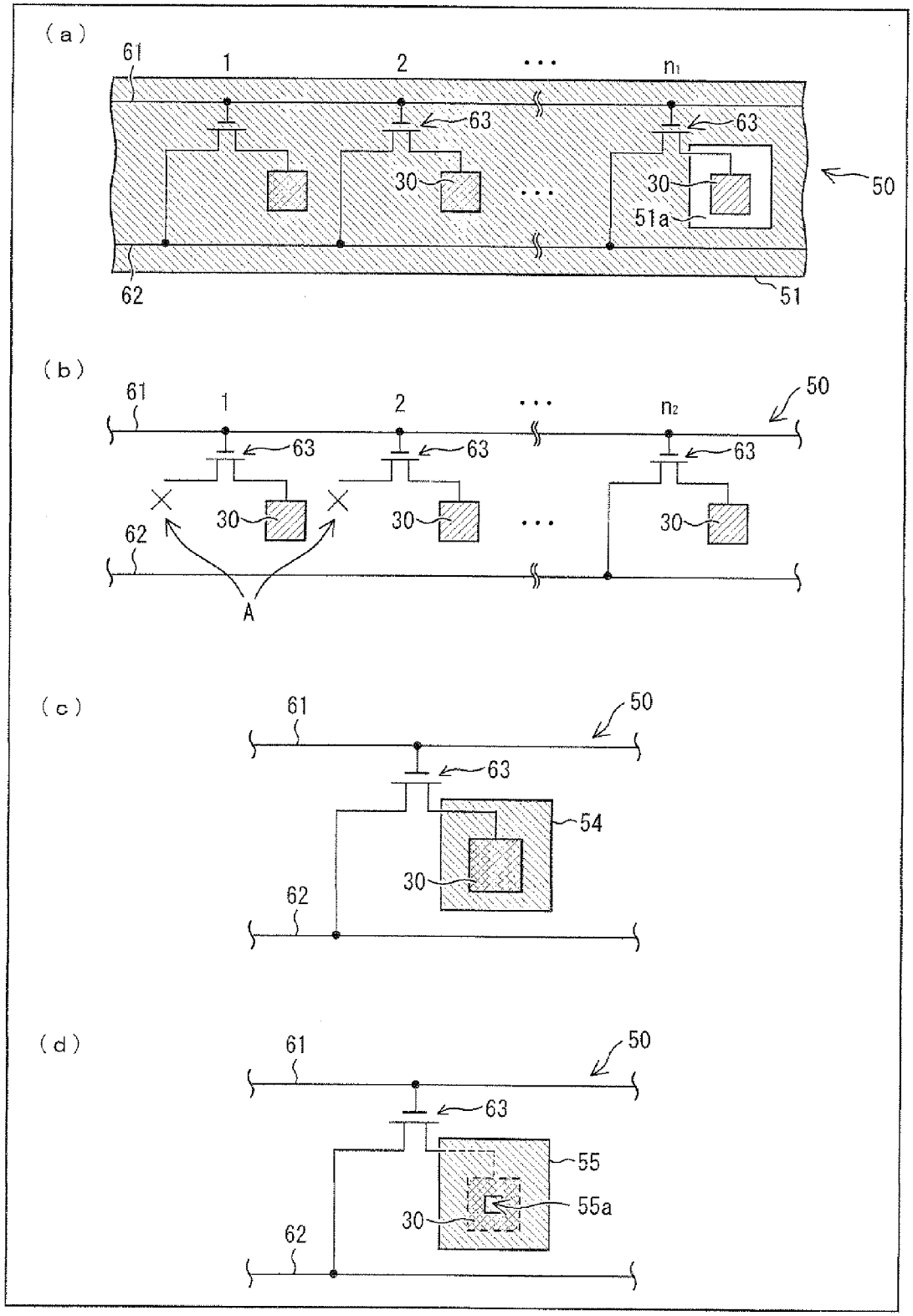
FIG. 9 includes schematic views (a) through (d) showing example configurations of a light intensity sensor provided in the liquid crystal panel shown in FIG. 1.

(a) through (d) of FIG. 9 show example configurations of light sensor elements constituting such a light intensity sensor 50. As shown in (a) through (d) of FIG. 9, each of the light sensor elements 30 is connected to the drain electrode of a TFT 63 provided in each pixel located in the outermost peripheral region within the display region. It should be noted that (a) through (d) of FIG. 9 also show a gate signal line 61 and a data signal line 62 connected to such a TFT 63.

The light intensity sensor 50 shown in (a) of FIG. 9 is configured such that only one of the $n_1$ (where $n_1$ is an integer of 2 or greater) light sensor elements 30 receives outside light. For that purpose, as shown in (a) of FIG. 9, the light intensity sensor 50 has a light blocking member 51 provided on ($n_1$−1) ones of the $n_1$ light sensor elements 30, and the light blocking member 51 has an opening 51a formed in a part thereof which is on the $n_1$th light sensor element 30. Such a configuration allows the plurality of light sensor elements 30 constituting the light intensity sensor 50 as a whole to receive $1/n_1$ of the amount of light that would be received if no such light blocking member were provided. This allows the light sensitivity of the light intensity sensor 50 to be $1/n_1$ of that of the visible light sensors 31A.

It should be noted that the light blocking member 51 can appropriately be made of an material that does not transmit light. Specific examples of the material of which the light blocking member 51 is made include a metal material, a black resin, and the like. For example, the light blocking member 51 can be formed by using a carbon black constituting the color filter layer formed in the counter substrate 22. In this case, it is only necessary, at the step of forming the color filter layer, to pattern a carbon black so that it is located in a region corresponding to a predetermined number of light sensor elements 30d out of those light sensor elements 30 constituting the light intensity sensor 50. Further, in order to be able to more surely block light, the light blocking member is preferably made of a metal material.

The light intensity sensor 50 shown in (b) of FIG. 9 is configured such that only one of the $n_2$ (where $n_2$ is an integer of 2 or greater) light sensor elements 30 is connected to a wire through which that light sensor element is driven (i.e., a data signal line 62). That is, in each of the ($n_2$−1) light sensor elements 30, as indicated by A in (b) of FIG. 9, the TFT 63 has it source electrode disconnected from the data signal line. A light sensor element 30 not connected to the light intensity sensor driving circuit 78 does not function as a light intensity sensor; therefore, in the foregoing configuration, only one of the $n_2$ elements functions as a light intensity sensor.

Such a configuration allows the plurality of light sensor elements 30 constituting the light intensity sensor 50 as a whole to receive $1/n_2$ of the amount of light that would be detected if all the light sensor elements 30 were connected to the data signal line 62. This allows the light sensitivity of the light intensity sensor 50 to be $1/n_2$ of that of the visible light sensors 31A.

The light intensity sensor 50 shown in (c) of FIG. 9 is configured to have a dark filter 54, provided on each of those light sensor elements 30 constituting the light intensity sensor 50, which reduce the amount of transmitted light to $1/n$. Such a configuration allows each of those light sensor elements 30 constituting the light intensity sensor 50 to receive $1/n$ of the amount of light that would be received if no such dark filter 54 were provided. This allows the light sensitivity of the light intensity sensor 50 to be $1/n$ of that of the visible light sensors 31A.

Such a dark filter 54 can be achieved by a wideband ND (neutral density) filter. An ND filter is a filter that uniformly lowers spectral transmittance, and is available as an absorption type, a reflection type, a complex type, etc.

The light intensity sensor 50 shown in (d) of FIG. 9 is configured to have a light blocking member 55 provided on each of those light sensor elements 30 constituting the light intensity sensor 50. The light blocking member 55 is provided with an opening 55a having an area of $1/n$ of that of the light-receiving section of the light sensor element 30. Such a configuration allows each of those light sensor elements 30 constituting the light intensity sensor 50 to receive $1/n$ of the amount of light that would be received if no such light blocking member 55 were provided. This allows the light sensitivity of the light intensity sensor 50 to be $1/n$ of that of the visible light sensors 31A. It should be noted that the light blocking member 55 can appropriately be made of an material that does not transmit light. Specific examples of the material of which the light blocking member 55 is made include a metal material, a black resin, and the like. However, in order to be able to more surely block light, the light blocking member is preferably made of a metal material.

Although not shown in (a) through (d) of FIG. 9, the light intensity sensor 50 may contain dark-current-compensating light sensor elements as compensating sensors for compensating for the detection characteristic of a light sensor that varies according to external factors such as temperature, as with the visible light sensors 31A and the infrared light sensors 31B.

As described above, the present embodiment uses, as light sensor elements for use in a light intensity sensor, light sensor elements having their sensitivity reduced by a predetermined percentage relative to those light sensor elements constituting an area sensor. Moreover, as for the structure of each light sensor element per se (i.e., the structures of a photodiode, a phototransistor, etc. constituting the light sensor element), those light sensor elements (e.g., the light sensor elements 30a, 30b, etc.) for use in the area sensor and those light sensor elements 30 for use in the light intensity sensor have identical structures. This makes it possible to match the sensor characteristics of the light intensity sensor and of the area sensor (visible light sensors and infrared light sensors).

The foregoing configuration makes it possible to accurately measure a wide range of environmental light intensities by reducing the sensitivity of those light sensor elements for use in the light intensity sensor by a predetermined percentage. Further, since the light intensity sensor can be made equal in sensor characteristic to those light sensor elements for use as the area sensor within the display region, an environmental light intensity obtained by the light intensity sensor can be accurately reflected in those light sensor elements for use in the area sensor.

Meanwhile, in the case of provision of a light intensity sensor only in a portion (dot region) of the display region, there is a possibility that if the palm of a hand whose finger is in touch with the panel surface is put over the light intensity sensor, the light intensity sensor may detect a light sensitivity that is lower than the actual value of environmental light intensity. However, if the outermost peripheral region of the display region serves as a light intensity sensor, the percentage of light blocked by the palm of a hand or the like from being received by the light intensity sensor is smaller than in the case of provision of a light intensity sensor only in a portion of the display region; therefore, a more accurate environmental light intensity can be obtained. Further, whereas a light intensity sensor disposed within the display region causes a portion corresponding to the light intensity sensor to appear as a black dot in a display image, a light intensity sensor disposed at the outermost periphery of the display region as described above makes a light intensity sensor that does not affect a displayed image.

Further, in the present embodiment, as shown in FIG. 1, those light sensor elements 30 constituting the light intensity sensor 50 may include two types of sensors, namely sensors that detect the intensity of visible light (such sensors being referred to as "light intensity sensors A") and sensors that detect the intensity of infrared light (such sensors being referred to as "light intensity sensor B"). In FIG. 1, those light sensor elements 30 constituting the light intensity sensor 50 are hatched.

Each of the light intensity sensors A is identical in basic configuration to the visible light sensor 31A shown in FIG. 3 and (a) of FIG. 5, and each of the light intensity sensors B is identical in basic configuration to the infrared light sensor 31B shown in FIG. 4 and (b) of FIG. 5. However, the light intensity sensor A is lower in light sensitivity than the visible light sensor 31A by a predetermined percentage. Further, the light intensity sensor B is lower in light sensitivity than the infrared light sensor 31B by a predetermined percentage.

These two types of light intensity sensors included make it possible to appropriately choose between switching to an area sensor corresponding to the intensity of infrared light and switching to an area sensor corresponding to the intensity of visible light. That is, in the case of use of those light intensity sensors A contained in the light intensity sensor 50, it is determined, in accordance with the intensity of infrared light, whether the visible light sensors 31A or the infrared light sensors 31B are used to carry out position detection; and in the case of use of those light intensity sensors B contained in the light intensity sensor 50, it is determined, in accordance with the intensity of visible light (i.e., illuminance), whether the visible light sensors 31A or the infrared light sensors 31B are used to carry out position detection.

The following describes a method for the liquid crystal display device 100 of the present embodiment to detect an input position.

The liquid crystal display device 100 of the present embodiment switches between carrying out position detection by using the visible light sensors 31A (sensors A) and carrying out position detection by using the infrared light sensors 31B (sensors B) in accordance with the light intensity detected by the light intensity sensor 50. This sensor switching can be determined by focusing attention on which of the two types of sensors can be used to carry out more accurate position detection in a specific range of light intensities.

The following describes a range of light intensities for which the sensors A are suited (range of light intensities in which the sensors A can carry out accurate position detection), a range of light intensities for which the sensors A are not suited (range of light intensities in which some errors may be observed in position detection), a range of light intensities for which the sensors B are suited (range of light intensities in which the sensors B can carry out accurate position detection), and a range of light intensities for which the sensors B are not suited (range of light intensities in which some errors may be observed in position detection).

Figure 10:
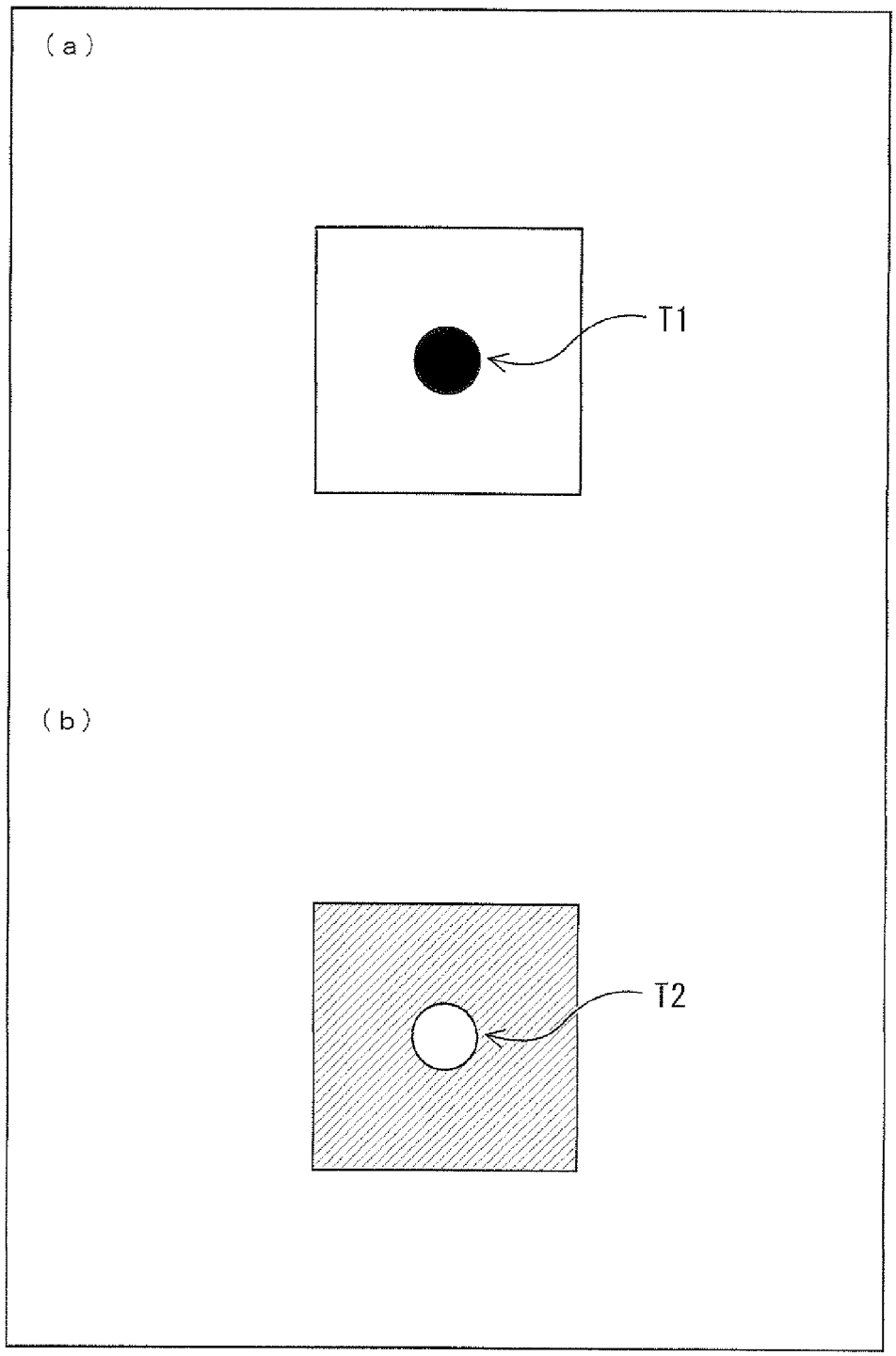
FIG. 10 includes: (a) a schematic view showing an image that is recognized when the sensors A are used; and (b) a schematic view showing an image that is recognized when the sensors B are used.

(a) of FIG. 10 shows how a touched part of the panel surface is recognized by the area sensor control section 70 when the sensors A are used, and (b) of FIG. 10 shows how a touched part of the panel surface is recognized by the area sensor control section 70 when the sensors B are used.

When the sensors A are used, as shown in (a) of FIG. 10, a part T1 touched with a finger or the like appears as a darker image than the other part. This is because blockage of outside light in the touched part causes the amount of light received by the light sensor elements 30a in the touched part to be smaller than that received by those light sensor elements 30a in the other region. On the other hand, when the sensors B are used, as shown in (b) of FIG. 10, a touched part T2 appears as a brighter image than the other part. This is because the backlight 10 of the liquid crystal display device 100 emits light containing infrared light and, in the touched part, the infrared light is reflected by a finger or the like touching the panel surface but, in the untouched part, the infrared light travels out of the liquid crystal panel (see FIG. 2).

Moreover, since the sensors A have such characteristics, the sensors A can suitably carry out position detection in a range of illuminances from 10,000 lux (lx) to 100,000 lux (lx), which are comparatively bright, as shown in (a) of FIG. 11. This is because in a dark environment it is difficult to distinguish between touched and untouched parts by means of visible light. Moreover, if, in such a dark environment, the liquid crystal panel 20 in particular is carrying out a bright image display such as a white display, and if a finger or the like is touching that bright image display region, the touched part is also recognized by the sensors A as a bright image. This makes misrecognition likely to occur.

On the other hand, since the sensors B have such characteristics, the sensors B can suitably carry out position detection in a range of illuminances shown in (b) of FIG. 11. As shown in (b) of FIG. 11, when the outside light is light emitted by a fluorescent lamp, the sensors B can carry out satisfactory position detection in all ranges of illuminances (specifically from 0 to 100,000 lux (lx)). This is because since the fluorescent light does not contain infrared light, the sensors B can carry out position detection without being affected by an environmental light intensity. Alternatively, when the outside light is sunlight, the sensors B can carry out satisfactory position detection in a range of illuminances from 0 to 10,000 lux (lx), which are comparatively dark. This is because the sunlight contains infrared light and, when the sunlight is strong, the intensity of infrared light becomes so high that the infrared light is detected by those light sensor elements 30b in the untouched part.

When the range of light intensities in which the sensors B can suitably carry out position detection is expressed as the intensity of infrared light, the sensors B can carry out satisfactory position detection if the intensity of infrared light in an environment where the liquid crystal display device 100 is placed is less than or equal to a value falling within a range of 1.00 to 1.80 mW/cm$^2$. It should be noted here that the intensity of infrared light is expressed by the integrated radiant intensity of light at wavelengths of 800 to 1,000 nm.

Accordingly, the liquid crystal display device 100 of the present embodiment divides the target range of illuminances into a range of illuminances for the sensors A and a range of illuminances for the sensors B as shown in (c) of FIG. 11, for example, and can switch between using the sensors A and using the sensors B, depending on within which of the target ranges of illuminances an environmental illuminance detected by the light intensity sensor 50 falls. In the example shown in (c) of FIG. 11, the sensors B carry out position detection if the illuminance falls within a range of not less than 0 lux (lx) to less than 10,000 lux (lx), and the sensors A carry out position detection if the illuminance falls within a range of not less than 10,000 lux (lx) to not greater than 100,000 lux (lx).

Alternatively, the liquid crystal display device 100 of the present embodiment can switch between using the sensors A and using the sensors B depending on whether or not the intensity of infrared light in an environment where the liquid crystal display device 100 is placed is greater than or equal to a predetermined value. It should be noted here that it is preferable that the predetermined value fall within a range of 1.00 to 1.80 mW/cm$^2$.

For such sensor switching, the area sensor control section 70 shown in FIG. 2 carries out a process as described below.

First, the light intensity sensor readout circuit 76 and the light intensity measuring section 77 calculates environmental light intensity on the basis of information detected by the light intensity sensor 50. At the same time, the area sensor readout circuit 73 reads position information detected by the sensors A and B. The position information obtained by the area sensor readout circuit 73 from the sensors A and B is sent to the coordinate extraction circuit 74 (sensor switching section).

The coordinate extraction circuit 74 determines, in accordance with the information on environmental light intensity transmitted from the light intensity measuring section 77, whether the position information detected by the sensors A or that detected by the sensors B is used to carry out position detection. The following describes a case where area sensor switching is carried out by using the light intensity sensors A and a case where area sensor switching is carried out by using the light intensity sensors B.

(1) Case Where Area Sensor Switching Is Carried Out by Using the Light Intensity Sensors A In accordance with the information on environmental illuminance (environmental light intensity) transmitted from the light intensity measuring section 77, the coordinate extraction circuit 74 recognizes, as an input position, a region (T1) obtained in black within a white region as shown in (a) of FIG. 10, if the environmental illuminance transmitted is greater than or equal to 10,000 lux, for example. On the other hand, if the environmental illuminance transmitted from the light intensity measuring section 77 is less than 10,000 lux, for example, the coordinate extraction circuit 74 recognizes, as an input position, a region (T2) indicated in white within a dark region as shown in (b) of FIG. 10.

In this way, the coordinate extraction circuit 74 uses different input position detection methods depending on whether or not the environmental illuminance is greater than or equal to a threshold value (e.g., 10,000 lux). If the environmental light intensity is greater than or equal to the threshold value, the coordinate extraction circuit 74 detects an input position by using the information obtained by the sensors A as position information; if the environmental illuminance is less than the threshold value, the coordinate extraction circuit 74 detects an input position by using the information obtained by the sensors B as position information.

(2) Case Where Area Sensor Switching Is Carried Out by Using the Light Intensity Sensors B In accordance with the information on infrared light intensity (environmental light intensity) transmitted from the light intensity measuring section 77, the coordinate extraction circuit 74 recognizes, as an input position, a region (T1) obtained in black within a white region as shown in (a) of FIG. 10, if the infrared light intensity transmitted is greater than or equal to a predetermined value (e.g., 40 mW/cm$^2$). On the other hand, if the environmental illuminance transmitted from the light intensity measuring section 77 is less a predetermined value (e.g., 40 mW/cm$^2$), the coordinate extraction circuit 74 recognizes, as an input position, a region (T2) indicated in white within a dark region as shown in (b) of FIG. 10.

In this way, the coordinate extraction circuit 74 uses different input position detection methods depending on whether or not the environmental infrared light intensity is greater than or equal to a threshold value. If the environmental infrared light intensity is greater than or equal to the threshold value, the coordinate extraction circuit 74 detects an input position by using the information obtained by the sensors A as position information; if the environmental infrared light intensity is less than the threshold value, the coordinate extraction circuit 74 detects an input position by using the information obtained by the sensors B as position information.

It should be noted that it is preferable that the predetermined value (threshold value) of infrared light intensity be selected from a range of values of 1.00 to 1.80 mW/cm$^2$.

The position information thus obtained in the coordinate extraction circuit 74 is outputted to the outside through the interface circuit 75.

In the liquid crystal display device 100 of the present embodiment, as described above, the coordinate extraction circuit 74 can change according to environmental light intensities the way an input position is detected. This makes it possible to use one coordinate extraction circuit to carry out position detection through the two types of sensors without providing a coordinate extraction circuit for the sensors A or a coordinate extraction circuit for the sensors B. This in turn makes it possible to achieve a reduction in circuit scale and a decrease in amount of information to be processed.

As described above, the liquid crystal display device 100 of the present embodiment can carry out position detection by using the two types of sensors, namely the sensors A that detect visible light and the sensors B that detect infrared light. This makes it possible to separately use the two types of sensors depending the different ranges of illuminances or ranges of intensities of infrared light for which the two types of sensors are suited respectively. This in turn makes it possible to carry out accurate position detection in a wider range of environmental light intensities than does an area sensor simply using two types of sensors of different light sensitivities.

Furthermore, the liquid crystal display device 100 of the present embodiment switches coordinate extraction methods according to environmental light intensities to extract the coordinates of a touched position in accordance with detected information from either of the two types of sensors and, therefore, can extract coordinates through the two types of sensors with just one coordinate extraction circuit.

The present embodiment has been described above by taking as an example a configuration in which the sensors A and B are disposed alternately in a checkered pattern; however, the present invention is not necessarily limited to such a configuration. The sensors A and B may be disposed randomly. Alternatively, the sensors A and B may be disposed alternately in rows.

However, in order to minimize a decrease in resolution due to the provision of the two types of light sensors, it is preferable, as in the present embodiment, that the sensors A and B be disposed alternately in a checkered pattern.

This point is discussed with reference to (a) and (b) of FIG. 12. (a) of FIG. 12 shows an example having its sensors A and B disposed alternately in a checkered pattern, and (b) of FIG. 12 shows an example having its row of sensors A and rows of sensors B disposed alternately.

Let it be assumed, for example, that the resolution of sensors A alone disposed in rows and columns in a matrix pattern is 60 dpi (dots per inch). Then, when two types of sensors (sensors A and B) are disposed in a checkered pattern as shown in (a) of FIG. 12, the horizontal (x-axis) and vertical (y-axis) resolutions are both $(1/\sqrt{2}) \times 60 \approx 42$ dpi.

Figure 12:
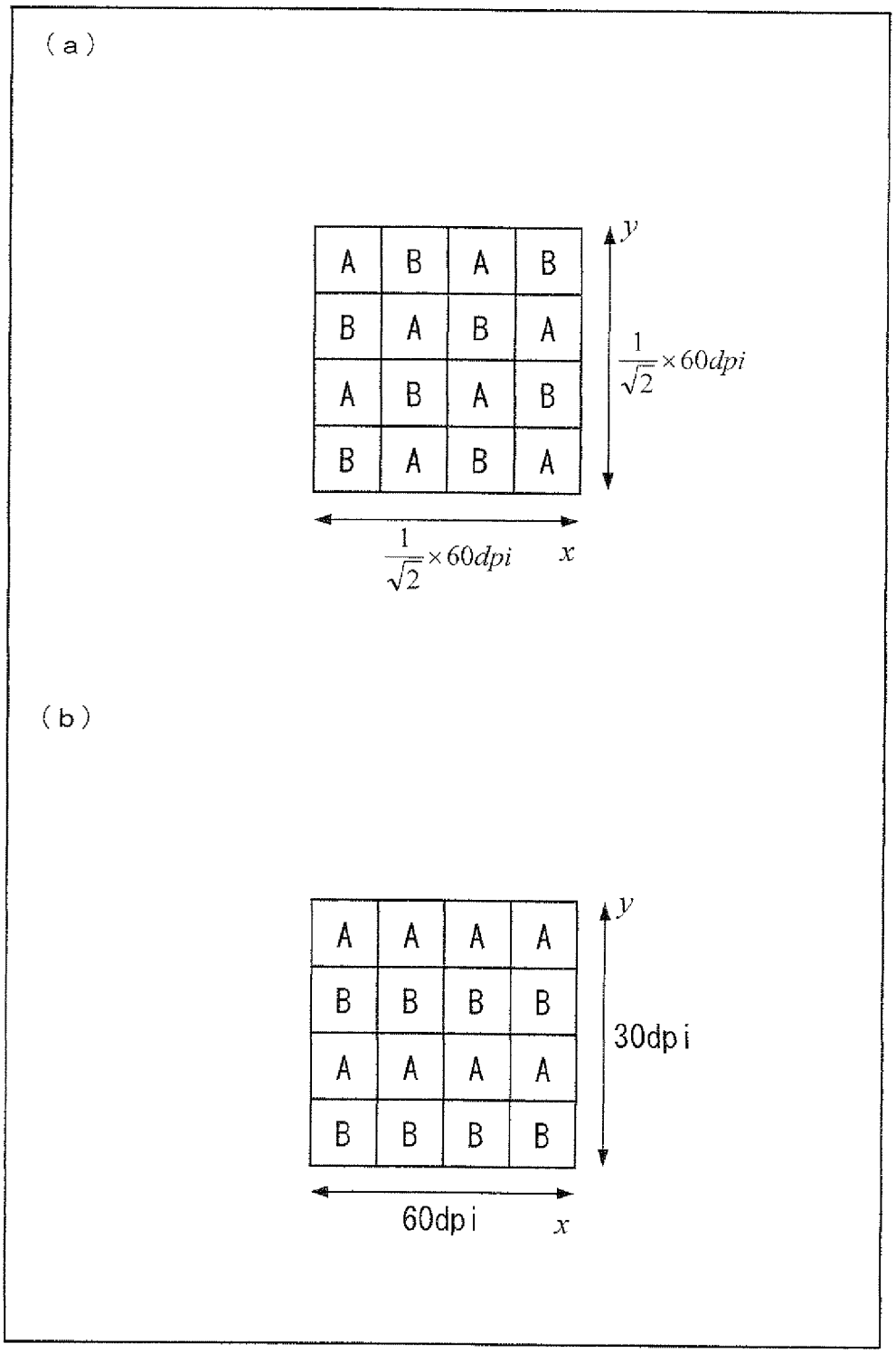
FIG. 12 includes: (a) a schematic view showing an example configuration of a liquid crystal panel having its sensors A and B disposed alternately in a checkered pattern; and (b) a schematic view showing an example configuration of a liquid crystal panel having its rows of sensors A and rows of sensors B disposed alternately.

On the other hand, when two types of sensors (sensors A and B) are disposed alternately in rows as shown in (b) of FIG. 12, the vertical (y-axis) resolution is $\frac{1}{2} \times 60 = 30$ dpi, whereas the horizontal (x-axis) resolution remains 60 dpi. In this case, the overall resolution ends up being a low vertical resolution. Further, there arises a difference between the vertical and horizontal resolutions.

By thus disposing the sensors A and B in a checkered pattern, a decrease in resolution due to the provision of the two types of light sensors can be minimized in comparison with the resolution of an area sensor constituted by only light sensors of one type, with the total number of light sensors unchanged.

Further, the present embodiment has been described above by taking as an example a configuration in which a light sensor element is provided for each pixel; however, in the present invention, such a light sensor element does not necessarily need to be provided for each pixel. Further, the present invention may be configured such that such a light sensor element is provided for any one of the R, G, and B pixel electrodes constituting a single pixel.

In the present embodiment, the light intensity sensor 50 is constituted by light sensor elements 30 identical in configuration to those light sensor elements 30 constituting the area sensor; however, the present invention is not limited to such a configuration. That is, a light intensity sensor of the present invention may be a light intensity sensor attached to an outer part of the liquid crystal panel or a sensor element different in configuration from the light sensor elements 30. Further, there may be a configuration provided with no light intensity sensor. Embodiment 2 below describes, as another example configuration of the present invention, a liquid crystal display provided with no light intensity sensor.

[Embodiment 2]

Figure 14:
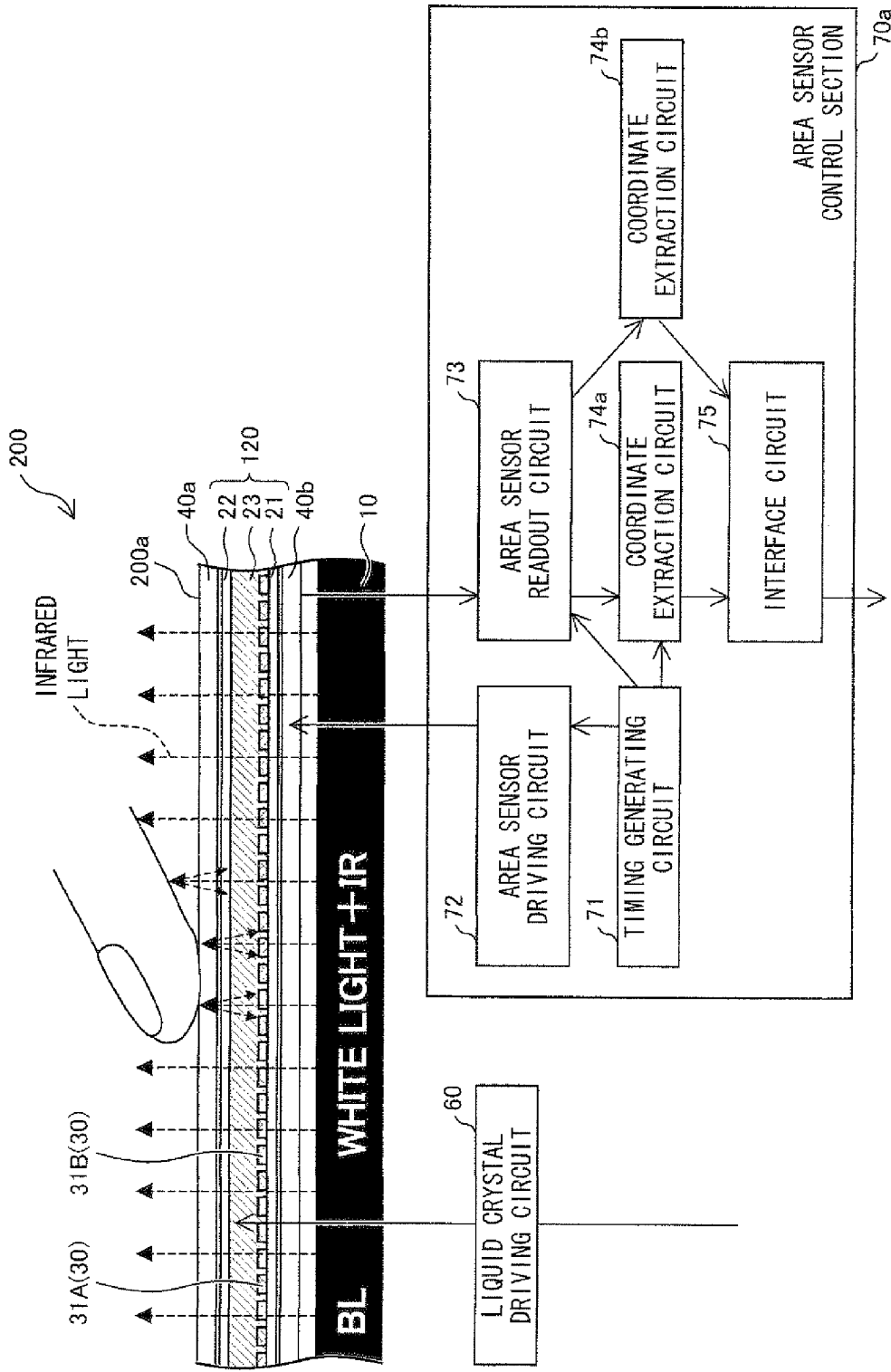
FIG. 14 is a schematic view showing the configuration of a liquid crystal display device according to a second embodiment of the present invention.

FIG. 14 shows the configuration of a touch-panel-integrated liquid crystal display device 200 (also simply called "liquid crystal display device 200") according to a second embodiment of the present embodiment. The liquid crystal display device 200 shown in FIG. 14 has a touch panel function of detecting the position of an input through detection of an image on a surface of a display panel by a light sensor element provided in each pixel. As shown in FIG. 14, the touch-panel-integrated liquid crystal display device 200 of the present embodiment includes: a liquid crystal panel 120 (position detecting section); and a backlight 10 (light-emitting section), provided toward a back surface of the liquid crystal panel 120, which irradiates the liquid crystal panel with light.

The liquid crystal panel 120 is substantially identical in configuration to the liquid crystal panel 20 of the liquid crystal display device 100 described in Embodiment 1. Therefore, only points of difference between the liquid crystal panels 120 and 20 are discussed here. Further, the backlight 10 is identical in configuration to that of the liquid crystal display device described in Embodiment 1 and, as such, is not described here.

FIG. 15 schematically shows the configuration of each sensor in a display region (active area) 120a of the liquid crystal panel 120. In the liquid crystal panel 20 of Embodiment 1, as shown in FIG. 1, those light sensor elements 30 provided in those pixels disposed in an outermost peripheral region within the display region 20a are used as the light intensity sensor 50. On the other hand, the liquid crystal panel 120 of Embodiment 2 is provided with no light intensity sensor. The liquid crystal panel 120 has light sensor elements 30 respectively provided in pixels within the display region 120a, and each of these light sensor elements constitutes either a sensor A or a sensor B (see FIG. 15). The other components of the liquid crystal panel 120, including the sensors A and B, are identical to those of the liquid crystal panel 20 and, as such, are not described here.

As shown in FIG. 14, the liquid crystal display device 200 is provided with a liquid crystal driving circuit 60 that drives the liquid crystal panel 120 to carry out a display and an area sensor control section 70a for driving the area sensor. FIG. 14 also shows internal components of the area sensor control section 70a. It should be noted that the configuration of the liquid crystal driving circuit of the present embodiment thus applied may be that which have conventionally been publicly known.

As shown in FIG. 14, the area sensor control section 70a includes a timing generating circuit 71, an area sensor driving circuit 72, an area sensor readout circuit 73, a coordinate extraction circuit (A) 74a, a coordinate extraction circuit (B) 74b, and an interface circuit 75.

The timing generating circuit 71 generates timing signals for controlling the circuits so that they operate in synchronization with each other.

The area sensor driving circuit 72 supplies a power source for driving the light sensor elements 30.

The area sensor readout circuit 73 receives received-light signals from the light sensor elements 30 that pass therethrough currents of different values depending on the amount of received light, and calculates the amount of received light from the value of a current thus obtained.

The coordinate extraction circuit (A) 74a and the coordinate extraction circuit (B) 74b calculate, in accordance with the amount of light received by the light sensor elements 30 as calculated by the area sensor readout circuit 73, the coordinates of a finger touching the surface (detector surface 200a) of the liquid crystal panel. More specifically, the coordinate extraction circuit (A) 74a calculates the coordinates of the finger in accordance with information from those light sensor elements 30a within each of the sensors A, and the coordinate extraction circuit (A) 74a calculates the coordinates of the finger in accordance with information from those light sensor elements 30a within each of the sensors B.

The interface circuit 75 outputs information on the coordinates of the finger as calculated by the coordinate extraction circuits 74 (position information) to the outside of the liquid crystal display device 200. The liquid crystal display device 200 is connected to a PC or the like through the interface circuit 75.

The following describes the flow of a process by which the area sensor control section 70 shown in FIG. 14 detects position information.

The area sensor readout circuit 73 reads information detected by the sensors A and B. After that, the area sensor readout circuit 73 sends the information from the sensors A to the coordinate extraction circuit (A) 74a and sends the information from the sensors B to the coordinate extraction circuit (B) 74b.

The coordinate extraction circuit (A) 74a is a circuit that recognizes, as an input position, a region obtained in black within a white region as shown in (a) of FIG. 10. On the other hand, the coordinate extraction circuit (B) 74b is a circuit that recognizes, as an input position, a region indicated in white within a dark region as shown in (b) of FIG. 10.

The interface circuit 75 detects an input position on the basis of information obtained from either of the two circuits.

Which information to adopt as position information here can be determined appropriately for any purpose. Since, as described in Embodiment 1, the sensors A and B have their respective optimum target ranges of illuminances, it is possible to adopt, as the area sensor's position information, information from the sensors of the type that can obtain more satisfactory position information under a particular illuminance.

Further, when either of the two types of sensors carries out detection under an environmental illuminance that is far off the optimum target range of illuminances, the touched part can no longer be recognized as image information that can be clearly detected as shown in (a) or (b) of FIG. 10. In such a case as this where it automatically becomes impossible to carry out detection by using either of the two types of sensors, it is possible to carry out position detection by adopting, as the area sensor's position information, information from the sensors of the type that is capable of detection.

As described above, the liquid crystal display device 200 of the present embodiment can carry out position detection by using the two types of sensors, namely the sensors A that detect visible light and the sensors B that detect infrared light. Moreover, the liquid crystal display device 200 of the present embodiment adopts a result of position detection from either of the two types of sensors as a result of position detection from the area sensor. This makes it possible to carry out accurate position detection in a wider range of environmental illuminances than does an area sensor simply using two types of sensors of different light sensitivities.

[Embodiment 3]

A third embodiment of the present invention is described below with reference to FIG. 16. It should be noted that the present invention is not limited to this.

In Embodiment 1 above, a touch-panel-integrated liquid crystal display device having an area sensor function (specifically, a touch panel function) has been described. In Embodiment 3, an area sensor not integrated with a display device is described.

Figure 16:
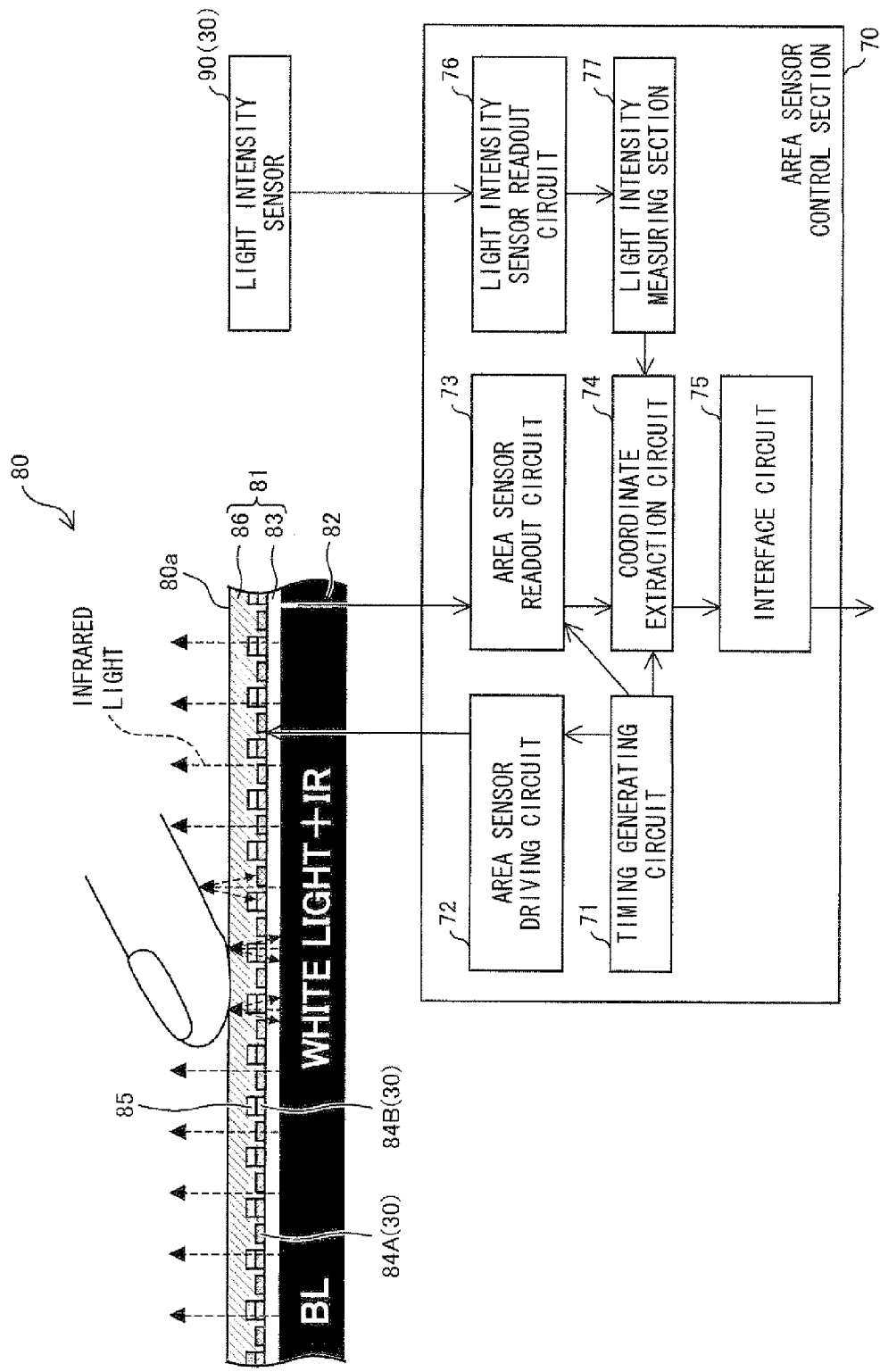
FIG. 16 is a schematic view showing the configuration of an area sensor according to an embodiment of the present invention.

An area sensor 80 shown in FIG. 16 includes a sensor section 81 for detecting the position of an input through detection of an image on a detector surface 80a by a plurality of light sensor elements 30 provided on a substrate, and thereby fulfilling a touch panel function.

As shown in FIG. 16, the area sensor 80 includes: the sensor section 81 (position detecting section) having the plurality of light sensor elements 30 provided on the substrate 83; and a light-emitting section 82, provided toward a back surface of the substrate 83, which irradiates the sensor section 81 with light. Each of the light sensor elements 30 is formed by a photodiode or a phototransistor and detects the amount of received light by passing therethrough a current corresponding to the intensity of the received light. A method for forming such a light sensor element can be carried out according to a conventionally publicly known method for manufacturing an area sensor. Further, the light sensor elements 30 of Embodiment 3 may be identical in configuration to those of Embodiment 1.

The area sensor 80 of the present embodiment is provided with three types of sensors, namely visible light sensors 84A, infrared light sensors 84B, and a light intensity sensor (illuminance sensor) 90. These sensors are each configured to contain light sensor elements 30, respectively. These light sensor elements 30 are disposed in rows and columns in a matrix pattern on the substrate 83. Accordingly, the sensors (visible light sensors 84A, the infrared light sensor 84B, and the light intensity sensor 90), each configured to contain one or more of such light sensor elements 30, are also disposed in rows and columns in a matrix pattern in keeping with the disposition of the light sensor elements 30.

The planar configuration of the sensors disposed on the substrate 83 thus applied may be identical to that of the liquid crystal panel 20 shown in FIG. 1. That is, let it be assumed that the visible light sensors 84A are sensors A and the infrared light sensors 84B are sensors B, then it is preferable that the sensors A and B be disposed alternately in a checkered pattern. The light intensity sensor 90 may also be identical in configuration to that of the liquid crystal panel 20 shown in FIG. 1. That is, it is preferable that those light sensor elements 30 disposed in an outermost peripheral region within a sensing region where the sensors are disposed be used as the light intensity sensor 90.

Further provided on each of the infrared light sensors 84B is an optical filter 85 for blocking visible light. This optical filter 85 can be configured as a laminated structure of a red color filter and a blue color filter as with an optical filter 25A of Embodiment 1.

Further, as in Embodiment 1, the visible light sensors 84A and the infrared light sensors 84B may contain dark-current-compensating light sensor elements as compensating sensors for compensating for the detection characteristic of a light sensor that varies according to external factors such as temperature.

The light-emitting section 82, disposed on a back surface of the substrate 83 (on that surface of the substrate 82 which faces away from the detector surface 80a), serves to irradiate the sensor section 81 with light. In the present embodiment, the light-emitting section 82 emits infrared light in addition to white light. Such a light-emitting section that emits light containing infrared light can be achieved by a publicly known method.

Further, the area sensor 80 is provided with an area sensor control section 70 for driving the area sensor. As shown in FIG. 16, the area sensor control section 70 includes a timing generating circuit 71, an area sensor driving circuit 72, an area sensor readout circuit 73, a coordinate extraction circuit 74, an interface circuit 75, a light intensity sensor readout circuit 76, and a light intensity measuring section 77. The area sensor control section is identical in configuration to that of Embodiment 1 described above and, as such, is not described here.

By having such a configuration, the area sensor 80 allows the light sensor elements 30 formed on the substrate 83 to detect the position of an input by capturing as an image a finger or input pen touching the detector surface 80a.

Further, the area sensor 80 of the present embodiment can carry out position detection by using the two types of sensors, namely the visible light sensors 84A that detect visible light and the infrared light sensors 84B that detect infrared light. This makes it possible to separately use the two types of sensors depending the different ranges of light intensities at which the two types of sensors excel respectively. This in turn makes it possible to carry out accurate position detection in a wider range of environmental light intensities than does an area sensor simply using two types of sensors of different light sensitivities.

Furthermore, the area sensor 80 of the present embodiment switches coordinate extraction methods according to environmental light intensities to extract the coordinates of a touched position in accordance with detected information from either of the two types of sensors and, therefore, can extract coordinates through the two types of sensors with just one coordinate extraction circuit.

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

An area sensor of the present invention and a liquid crystal display device equipped with such an area sensor make accurate position detection possible in a wider range of environmental light intensities. The present invention can be applied to a display device, such as a mobile phone or a PC, whose display screen has a touch panel function.

REFERENCE SIGNS LIST

10 Backlight (light-emitting section)
20 Liquid crystal panel (position detecting section)
21 Active matrix substrate
22 Counter substrate
23 Liquid crystal layer
25 Optical filter
25A Optical filter
25B Blue color filter
25R Red color filter
25D Optical filter
26 Optical filter structure
30 Light sensor element
30a Light sensor element (of a visible light sensor)
30b Light sensor element (of an infrared light sensor)
31A Visible light sensor
31B Infrared light sensor
40a Front-side polarizing plate
40b Back-side polarizing plate
50 Light intensity sensor (illuminance sensor)
70 Area sensor control section
70a Area sensor control section
74 Coordinate extraction circuit
74a Coordinate extraction circuit (A)
74b Coordinate extraction circuit (B)
80 Area sensor
80a Detector surface
82 Light-emitting section
84A Visible light sensor
84B Infrared light sensor
85 Optical filter
90 Light intensity sensor (illuminance sensor)
100 Touch-panel-integrated liquid crystal display device (liquid crystal display device)
100a Panel surface (detector surface)
120 Liquid crystal panel
200 Touch-panel-integrated liquid crystal display device (liquid crystal display device)
200a Panel surface (detector surface)

The invention claimed is:

1. An area sensor for detecting the position of an input from an outside source by detecting an image on a detector surface, the area sensor comprising:
    a position detecting section comprising visible light sensors each comprising light sensor elements that detect the intensity of received visible light and infrared light sensors each comprising light sensor elements that detect the intensity of received infrared light, the position detection section being configured to detect an input position by the visible light sensors and the infrared light sensors separately detecting an image on the detector surface; and
    a light-emitting section configured to irradiate the position detecting section with light containing infrared light from behind;
    wherein the light sensor elements comprising each of the infrared light sensors are each comprise an optical filter configured to block visible light; and
    wherein the optical filter comprises a laminated structure comprising a red color filter and a blue color filter.

2. The area sensor as set forth in claim 1, wherein:
    if the intensity of infrared rays in an environment where the area sensor is placed is greater than or equal to a predetermined value, the position detecting section carries out position detection by using the visible light sensors; and
    if the intensity of infrared rays in an environment where the area sensor is placed is less than the predetermined value, the position detecting section carries out position detection by using the infrared light sensors.

3. The area sensor as set forth in claim 2, wherein the predetermined value of intensity of infrared light falls within a range of 1.00 to 1.80 mW/cm$^2$, based on the integrated radiant intensity of light at wavelengths of 800 to 1,000 nm.

4. The area sensor as set forth in claim 1, further comprising:
    a light intensity sensor configured to measure the intensity of infrared rays in an environment where the area sensor is placed; and
    a sensor switching section which, if the intensity of infrared rays measured by the light intensity sensor is greater than or equal to a predetermined value, is configured to use information obtained from the visible light sensors as position information and which, if the intensity of infrared rays measured by the light intensity sensor is less than the predetermined value, is configured to use information obtained from the infrared light sensors as position information.

5. The area sensor as set forth in claim 4, wherein the predetermined value of intensity of infrared light falls within a range of 1.00 to 1.80 mW/cm$^2$, based on the integrated radiant intensity of light at wavelengths of 800 to 1,000 nm.

6. The area sensor as set forth in claim 1, wherein:
    if the illuminance of an environment where the area sensor is placed is greater than or equal to a predetermined value, the position detecting section carries out position detection by using the visible light sensors; and
    if the illuminance of an environment where the area sensor is placed is less than the predetermined value, the position detecting section carried out position detection by using the infrared light sensors.

7. The area sensor as set forth in claim 1, further comprising:
    an illuminance sensor configured to measure the illuminance of an environment where the area sensor is placed; and
    a sensor switching section which, if the illuminance measured by the illuminance sensor is greater than or equal to a predetermined value, is configured to use information obtained from the visible light sensors as position information and which, if the illuminance measured by the illuminance sensor is less than the predetermined value, is configured to use information obtained from the infrared light sensors as position information.

8. The area sensor as set forth in claim 1, wherein:
    the visible light sensors and the infrared light sensors are disposed in rows and columns in a matrix pattern; and
    the visible light sensors and the infrared light sensors are disposed alternately in a checkered pattern.

9. The area sensor as set forth in claim 8, wherein:
    the visible light sensors and the infrared light sensors are disposed in rows and columns in a matrix pattern; and
    the visible light sensors and the infrared light sensors are disposed alternately in a checkered pattern.

10. A liquid crystal display device comprising a liquid crystal panel comprising an area sensor as set forth in claim 1.

11. An area sensor for detecting the position of an input from an outside source by detecting an image on a detector surface, the area sensor comprising:
    a position detecting section comprising visible light sensors each comprising light sensor elements that detect the intensity of received visible light and infrared light sensors each comprising light sensor elements that detect the intensity of received infrared light, the position detection section being configured to detect an input position by the visible light sensors and the infrared light sensors separately detecting an image on the detector surface;
    a light-emitting section configured to irradiate the position detecting section with light containing infrared light from behind;
    wherein if the intensity of infrared rays in an environment where the area sensor is placed is greater than or equal to a predetermined value, the position detecting section carries out position detection by using the visible light sensors; and
    if the intensity of infrared rays in an environment where the area sensor is placed is less than the predetermined value, the position detecting section carries out position detection by using the infrared light sensors.

12. The area sensor as set forth in claim 11, wherein the light sensor elements comprising each of the infrared light sensors each comprise an optical filter for blocking visible light.

13. The area sensor as set forth in claim 12, wherein the optical filter comprises a mixture of a red pigment, a green pigment, and a blue pigment.

14. The area sensor as set forth in claim 11, wherein:
    the visible light sensors and the infrared light sensors are disposed in rows and columns in a matrix pattern; and
    the visible light sensors and the infrared light sensors are disposed alternately in a checkered pattern.

15. A liquid crystal display device comprising a liquid crystal panel comprising an area sensor as set forth in claim 11.

16. An area sensor for detecting the position of an input from an outside source by detecting an image on a detector surface, the area sensor comprising:
    a position detecting section comprising visible light sensors each comprising light sensor elements that detect the intensity of received visible light and infrared light sensors each comprising light sensor elements that detect the intensity of received infrared light, the position detection section being configured to detect an input position by the visible light sensors and the infrared light sensors separately detecting an image on the detector surface; and a light-emitting section configured to irradiate the position detecting section with light containing infrared light from behind;

an illuminance sensor configured to measure the illuminance of an environment where the area sensor is placed; and a sensor switching section which, if the illuminance measured by the illuminance sensor is greater than or equal to a predetermined value, is configured to use information obtained from the visible light sensors as position information and which, if the illuminance measured by the illuminance sensor is less than the predetermined value, is configured to use information obtained from the infrared light sensors as position information.

17. The area sensor as set forth in claim 16, wherein the light sensor elements comprises each of the infrared light sensors each comprise an optical filter for blocking visible light.

18. The area sensor as set forth in claim 17, wherein the optical filter comprises a mixture of a red pigment, a green pigment, and a blue pigment.

19. A liquid crystal display device comprising a liquid crystal panel comprising an area sensor as set forth in claim 16.

* * * * *